(12) United States Patent
Suzuki et al.

(10) Patent No.: US 7,193,634 B2
(45) Date of Patent: Mar. 20, 2007

(54) IMAGE TRANSFERRING APPARATUS AND METHOD, FILE TRANSFERRING APPARATUS AND METHOD, AND PROGRAM STORAGE MEDIUM

(75) Inventors: Satoshi Suzuki, Tokyo (JP); Hiroshi Tsuyuki, Kanagawa (JP); Masakazu Hayashi, Chiba (JP); Hideyuki Agata, Tokyo (JP)

(73) Assignee: Sony Corporation, Tokyo (JP)

( * ) Notice: Subject to any disclaimer, the term of this patent is extended or adjusted under 35 U.S.C. 154(b) by 500 days.

(21) Appl. No.: 09/947,604

(22) Filed: Sep. 6, 2001

(65) Prior Publication Data
US 2002/0075281 A1 Jun. 20, 2002

(30) Foreign Application Priority Data
Sep. 7, 2000 (JP) ............................. 2000-276644

(51) Int. Cl.
G09G 5/377 (2006.01)
(52) U.S. Cl. ...................................... 345/629; 345/619
(58) Field of Classification Search ................ 345/619, 345/629; 707/101, 102, 10; 709/203
See application file for complete search history.

(56) References Cited

U.S. PATENT DOCUMENTS

| | | | | |
|---|---|---|---|---|
| 5,199,102 A | * | 3/1993 | Sakuragi ..................... 345/668 |
| 5,235,681 A | * | 8/1993 | Masuzaki et al. ........... 345/556 |
| 5,339,409 A | * | 8/1994 | Sakuragi ....................... 707/3 |
| 5,428,721 A | * | 6/1995 | Sato et al. ................... 345/650 |
| 5,500,923 A | * | 3/1996 | Kuroshima et al. ........ 358/1.15 |
| 5,761,340 A | * | 6/1998 | Suzuki ........................ 382/189 |
| 5,835,923 A | * | 11/1998 | Shibata et al. ............... 715/526 |
| 5,844,689 A | * | 12/1998 | Kawase ....................... 358/296 |
| 5,893,077 A | * | 4/1999 | Griffin .......................... 705/34 |
| 5,937,232 A | * | 8/1999 | Taguchi et al. ............... 399/81 |
| 6,008,812 A | * | 12/1999 | Ueda et al. .................. 345/418 |

(Continued)

FOREIGN PATENT DOCUMENTS

EP 0 930 757 7/1999

OTHER PUBLICATIONS

Using the Multi-Layer Model for Building Interactive Graphical Applications, Jean-Daniel Fekete, Michel Beaudouin-Lafon Laboratoire de Recherche en Informatique, pp. 109-118, 1996 ACM.*

(Continued)

*Primary Examiner*—Kee M. Tung
*Assistant Examiner*—J. Amini
(74) *Attorney, Agent, or Firm*—Oblon, Spivak, McClelland, Maier & Neustadt, P.C.

(57) ABSTRACT

Disclosed is an image transferring apparatus for transferring an image displayed by a first program to a second program. The image transferring apparatus comprises: image copying means for storing a copy of the image into a predetermined temporary storage area; and image transferring means for acquiring the copy of the image from the temporary storage area before transferring the acquired copy to the second program. With this configuration, the image displayed by a first program is transferred to a second program by way of a temporary storage area, in accordance with display position information about the on-screen image, or in the form of a file accommodating the image of interest. The transfer of the image between the programs is accomplished in a simplified and reliable manner.

13 Claims, 17 Drawing Sheets

U.S. PATENT DOCUMENTS

| | | | | |
|---|---|---|---|---|
| 6,091,518 | A * | 7/2000 | Anabuki | 358/500 |
| 6,111,586 | A * | 8/2000 | Ikeda et al. | 345/619 |
| 6,167,562 | A * | 12/2000 | Kaneko | 717/109 |
| 6,182,080 | B1 * | 1/2001 | Clements | 707/102 |
| 6,184,860 | B1 * | 2/2001 | Yamakawa | 715/823 |
| 6,195,101 | B1 * | 2/2001 | Ghislain Bossut et al. | 345/629 |
| 6,222,545 | B1 * | 4/2001 | Suzuki et al. | 345/418 |
| 6,262,728 | B1 * | 7/2001 | Alexander | 345/440.1 |
| 6,338,110 | B1 * | 1/2002 | van Cruyningen | 710/317 |
| 6,412,008 | B1 * | 6/2002 | Fields et al. | 709/228 |
| 6,415,373 | B1 * | 7/2002 | Peters et al. | 711/167 |
| 6,442,551 | B1 * | 8/2002 | Ofek | 707/10 |
| 6,596,031 | B1 * | 7/2003 | Parks | 715/513 |
| 6,810,410 | B1 * | 10/2004 | Durham | 709/203 |
| 7,046,258 | B1 * | 5/2006 | Naito et al. | 345/619 |
| 2002/0048413 | A1 * | 4/2002 | Kusunoki | 382/282 |
| 2002/0067500 | A1 * | 6/2002 | Yokomizo et al. | 358/1.15 |
| 2002/0073121 | A1 * | 6/2002 | Sano et al. | 707/517 |
| 2005/0257273 | A1 * | 11/2005 | Naito et al. | 726/26 |
| 2006/0033942 | A1 * | 2/2006 | Yamazaki et al. | 358/1.12 |

OTHER PUBLICATIONS

Making faces Brian Guenter, Cindy Grimm, Daniel Wood, Henrique Malvar, Fredric Pighin, Jul. 1998,Proceedings of the 25th annual conference on Computer graphics and interactive techniques.*

Vision-assisted image editing Eric N. Mortensen , Nov. 1999, ACM SIGGRAPH Computer Graphics, vol. 33 Issue 4.*

Image editing in the contour domainElder, J.H.; Goldberg, R.M. ;Computer Vision and Pattern Recognition, 1998. Proceedings. 1998 IEEE Computer Society Conference on Jun. 23-25, 1998 pp. 374-381.*

Vision-assisted image editing , Eric N. Mortensen Nov. 1999 ACM SIGGRAPH Computer Graphics, vol. 33 Issue 4 Publisher: ACM Press.*

Metadata visualization for digital libraries: interactive timeline editing and review Vijay Kumar, Richard Furuta, Robert B. Allen May 1998 Proceedings of the third ACM conference on Digital libraries Publisher: ACM Press.*

Visualization using timelines Gerald M. Karam Aug. 1994 Proceedings of the 1994 ACM SIGSOFT international symposium on Software testing and analysis Publisher: ACM Press.*

Patent Abstracts of Japan vol. 1997, No. 03, Mar. 31, 1997 & JP 08 307653 A (Nikon Corp), Nov. 22, 1996.

Patent Abstracts of Japan vol. 018, No. 535, (E-1615), Oct. 12, 1994 & JP 06 189108 A (Hitachi Ltd), Jul. 8, 1994.

* cited by examiner

US 7,193,634 B2

IMAGE TRANSFERRING APPARATUS AND METHOD, FILE TRANSFERRING APPARATUS AND METHOD, AND PROGRAM STORAGE MEDIUM

BACKGROUND OF THE INVENTION

The present invention relates to an image transferring apparatus, an image transferring method, a file transferring apparatus, a file transferring method, and a program storage medium. More particularly, the invention relates to an image transferring apparatus, an image transferring method, a file transferring apparatus, a file transferring method, and a program storage medium which can be suitably applied to personal computers, for example.

Heretofore, using a personal computer to edit an image displayed by a program, such as adding lines or characters to the image, required the user of the PC (Personal Computer) to perform a number of steps. Typically, the user initially stored the image by copying it into a temporary storage area called a clipboard or by transforming it into a file for storage onto a hard disc drive. The user then booted an image editing program, read the image in question from the clipboard or from the stored file, and transferred the image to the image editing program for display and editing purposes.

One problem with operating the personal computer in such a manner is that the whole process is a tedious chore because of the operations to be made by the user: filing the image of interest, copying it into the clipboard, and starting the image editing program to read the copy. Another problem is that when the target image is displayed by the image editing program, the position, size and scale of the image being displayed can be different from those of the original image, which can be a significant inconvenience to the user.

SUMMARY OF THE INVENTION

It is therefore an object of the present invention to provide an image transferring apparatus, an image transferring method, a file transferring apparatus, a file transferring method, and a program storage medium intended to overcome the above-described drawbacks of the prior art, thereby a target image is transferred from one program to another by performing simplified operations.

In carrying out the invention and according to a first aspect thereof, there is provided an image transferring apparatus for transferring an image displayed by a first program to a second program, the image transferring apparatus comprising: image copying means for storing a copy of the image into a predetermined temporary storage area; and image transferring means for acquiring the copy of the image from the temporary storage area before transferring the acquired copy to the second program.

In carrying out the invention and according to a second aspect thereof, there is provided an image transferring apparatus for transferring an image displayed by a first program to a second program, the image transferring apparatus comprising: display position information acquiring means for acquiring display position information about the image on a predetermined display screen; and image transferring means for acquiring the image based on the display position information before transferring the acquired image to the second program.

In carrying out the invention and according to a third aspect thereof, there is provided an image transferring apparatus for transferring an image displayed by a first program to a second program, the image transferring apparatus comprising: image storing means for transforming the image to a file before storing the file into a predetermined storage location; and image transferring means for acquiring the file from the storage location before transferring the acquired file to the second program.

In carrying out the invention and according to a fourth aspect thereof, there is provided an image transferring method for transferring an image displayed by a first program to a second program, the image transferring method comprising the steps of: storing a copy of the image into a predetermined temporary storage area; and acquiring the copy of the image from the temporary storage area before transferring the acquired copy to the second program.

In carrying out the invention and according to a fifth aspect thereof, there is provided an image transferring method for transferring an image displayed by a first program to a second program, the image transferring method comprising the steps of: acquiring display position information about the image on a predetermined display screen; and acquiring the image based on the display position information before transferring the acquired image to the second program.

In carrying out the invention and according to a sixth aspect thereof, there is provided an image transferring method for transferring an image displayed by a first program to a second program, the image transferring method comprising the steps of: transforming the image to a file before storing the file into a predetermined storage location; and acquiring the file from the storage location before transferring the acquired file to the second program.

In carrying out the invention and according to a seventh aspect thereof, there is provided a file transferring apparatus for transferring a file generated by a first program to an electronic mail program whereby the file is attached to an electronic mail for simultaneous transmission, the file transferring apparatus comprising: storage location information acquiring means for acquiring from the first program storage location information about a storage location where the file is stored; and file transferring means for acquiring the file based on the storage location information before transferring the file to the electronic mail program.

In carrying out the invention and according to a eighth aspect thereof, there is provided a file transferring method for transferring a file generated by a first program to an electronic mail program whereby the file is attached to an electronic mail for simultaneous transmission, the file transferring method comprising the steps of: acquiring from the first program storage location information about a storage location where the file is stored; and acquiring the file based on the storage location information before transferring the file to the electronic mail program.

In carrying out the invention and according to a ninth aspect thereof, there is provided a program for transferring an image displayed by a first program to a second program, the program comprising the steps of: storing a copy of the image into a predetermined temporary storage area; and acquiring the copy of the image from the temporary storage area before transferring the acquired copy to the second program.

In carrying out the invention and according to a tenth aspect thereof, there is provided a program for transferring an image displayed by a first program to a second program, the program comprising the steps of: acquiring display position information about the image on a predetermined display screen; and acquiring the image based on the display position information before transferring the acquired image to the second program.

In carrying out the invention and according to a eleventh aspect thereof, there is provided a program for transferring an image displayed by a first program to a second program, the program comprising the steps of: transforming the image to a file before storing the file into a predetermined storage location; and acquiring the file from the storage location before transferring the acquired file to the second program.

In carrying out the invention and according to a twelfth aspect thereof, there is provided a program for transferring a file generated by a first program to an electronic mail program whereby the file is attached to an electronic mail for simultaneous transmission, the program comprising the steps of: acquiring from the first program storage location information about a storage location where the file is stored; and acquiring the file based on the storage location information before transferring the file to the electronic mail program.

With this configuration, the image displayed by one program is transferred to another program by way of a temporary storage area, in accordance with display position information about the on-screen image, or in the form of a file accommodating the image of interest. The transfer of the image between the programs is accomplished in a simplified and reliable manner.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENTS

Preferred embodiments of this invention will now be described with reference to the accompanying drawings.

Figure 1:
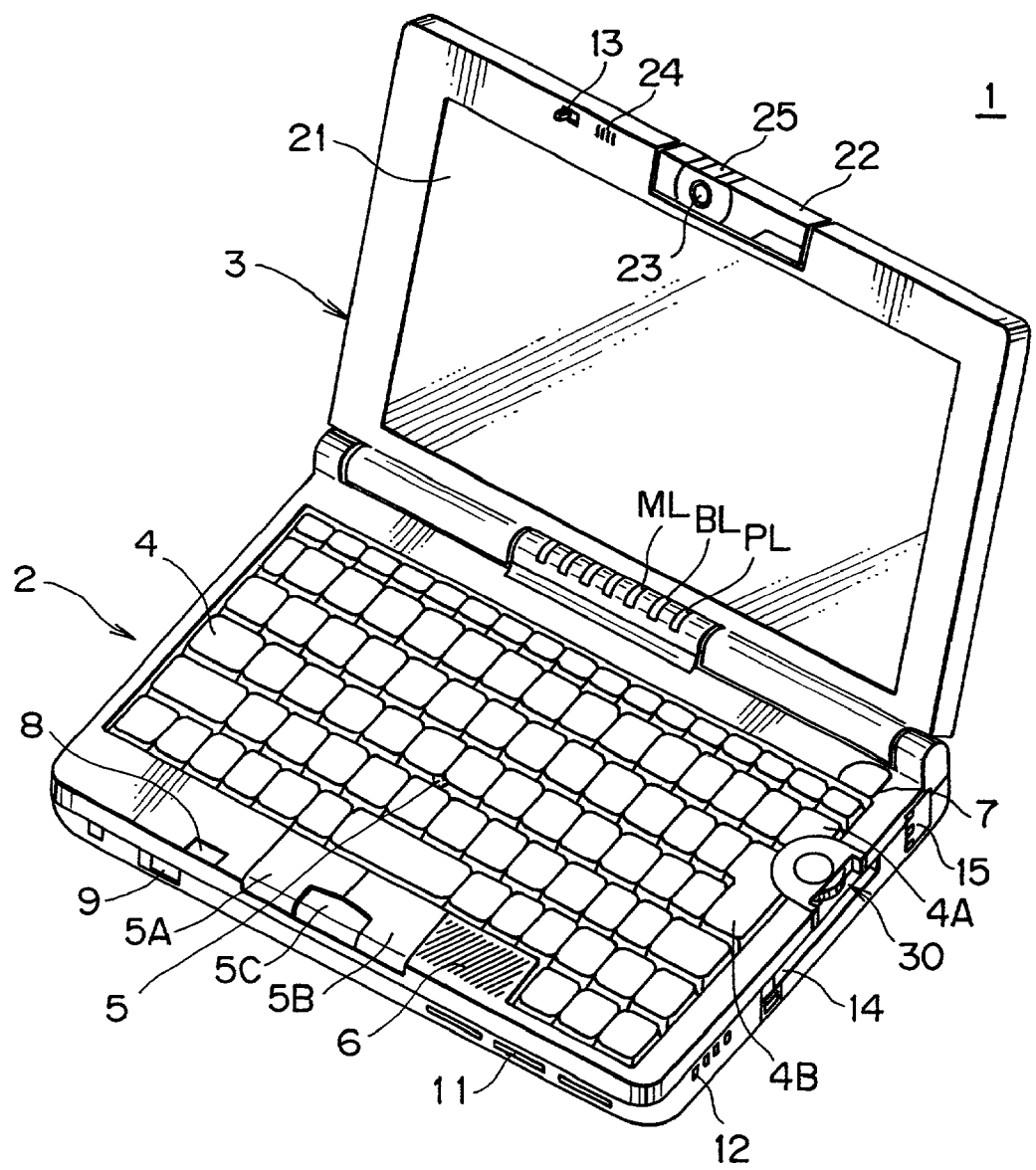
FIG. 1 is a schematic view showing an overall structure of a notebook-type personal computer practiced as a first embodiment of this invention.

(1) First embodiment (1-1) Overall Structure of a Notebook-type Personal Computer FIG. 1 is a schematic view showing an overall structure of a notebook-type personal computer 1 (called the notebook computer hereunder) as an information processing apparatus. The notebook computer 1 is constituted primarily by a body 2 and a display unit 3 attached swingingly to the body 2.

The body 2 has on its top a plurality of operation keys 4 operated to enter various characters, numbers and symbols; a stick type pointing device 5 (simply called the stick hereunder) used to move a mouse cursor; a left and a right click button 5A and 5B corresponding to the left and right buttons of the regular mouse; a center button 5C for operating a scroll bar without pointing the mouse cursor to scroll buttons; a built-in speaker 6; and a shutter button 7 for operating a CCD (Charge-Coupled Device) camera 23 mounted on the display unit 3.

The front of the display unit 3 has an LCD (Liquid Crystal Display) 21 for displaying images. At the center top of the LCD 21 is an image pickup unit 22 equipped with the CCD camera 23; the unit 22 is attached rotatably to the display unit 3.

The image pickup unit 22 may be rotated to any position at angles up to 180 degrees forwards and backwards relative to the display unit 3. The image pickup unit 22 has a focusing ring 25 used to adjust the focus of the CCD camera 23. When the CCD camera 23 is operated to pick up desired images, rotation of the focusing ring 25 permits easy focusing of the camera 23.

On the display unit 3, a microphone 24 is furnished on the left of the image pickup unit 22. The microphone 24 is designed to pick up sound not only from the front of the display unit 3 but also from the back.

A pawl 13 is located to the left of the microphone 24 on the display unit 3. The body 2 has a hole 8 positioned so as to match the pawl 13. That is, the pawl 13 locks into the hole 8 in the body 2 when the display unit 3 is fitted shut onto body 2.

A slide lever 9 furnished at the front side of the body 2 is moved crosswise to release the pawl 13 from its locked state so that the display unit 3 may be swung open from the body 2. Also at the front side of the body 2 are a plurality of suction ports 11.

The right-hand side of the body 2 has an exhaust port 12, a slot 14 into which a PC (Personal Computer) card of PCMCIA (Personal Computer Memory Card International Association) standards may be inserted, and a modem terminal 15 for a modular jack.

Figure 2:
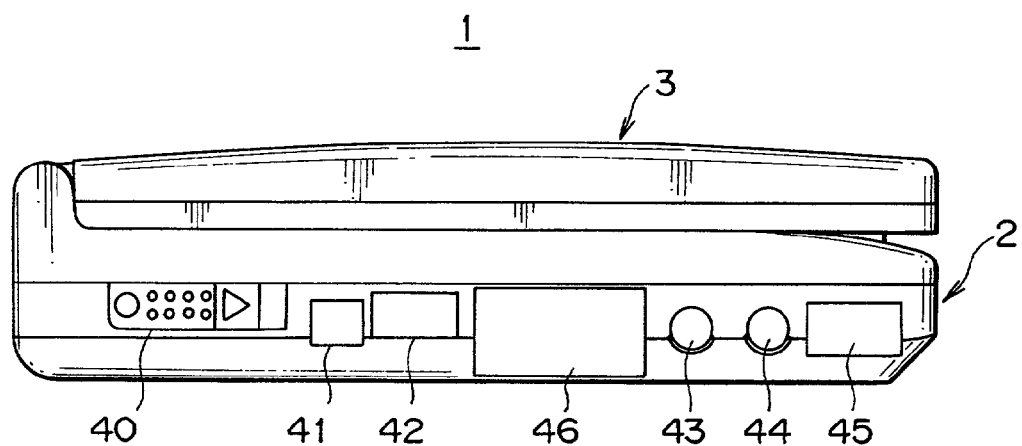
FIG. 2 is a schematic view depicting a left-hand side structure of the computer body.

As shown in FIG. 2, the left-hand side of the body 2 has a slide type power switch 40, a four-pin IEEE (Institute of Electrical and Electronic Engineers) 1394 terminal 41, a USB (Universal Serial Bus) terminal 42, an external display connector 46, a microphone input terminal 43, a headphone terminal 44, and an infrared port 45 compatible with IrDA (Infrared Data Association) standards.

Figure 3:
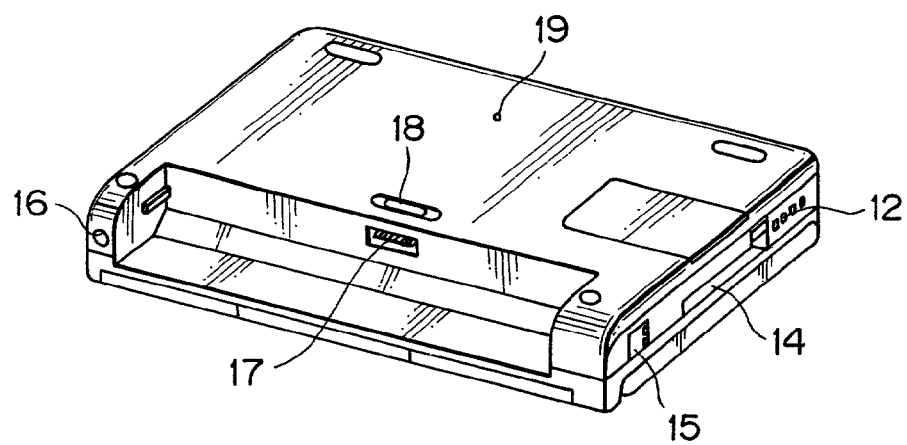
FIG. 3 is a schematic view illustrating a back side and bottom structure of the body.

As shown in FIG. 3, the back side of the body 2 has an external power supply connector 16. At the bottom of the body 2 are a slide lever 18 for releasing a battery pack (not shown) from its place and a reset switch 19 that may be operated to interrupt the ongoing operation and reconstitute the system environment in effect upon boot-up. The battery pack is connected detachably to a battery connector 17.

In addition, the body 2 has in its top right corner (FIG. 1) a jog dial 30 between an operation key 4A functioning as a backspace key and another operation key 4B serving as an enter key. The jog dial 30 is flush with the keys 4A and 4B.

The jog dial 30 provides an easy-to-operate user interface. When suitably rotated and pushed in, the jog dial 30 accomplishes set-up of the system and implements diverse functions of various application programs.

Figure 4:
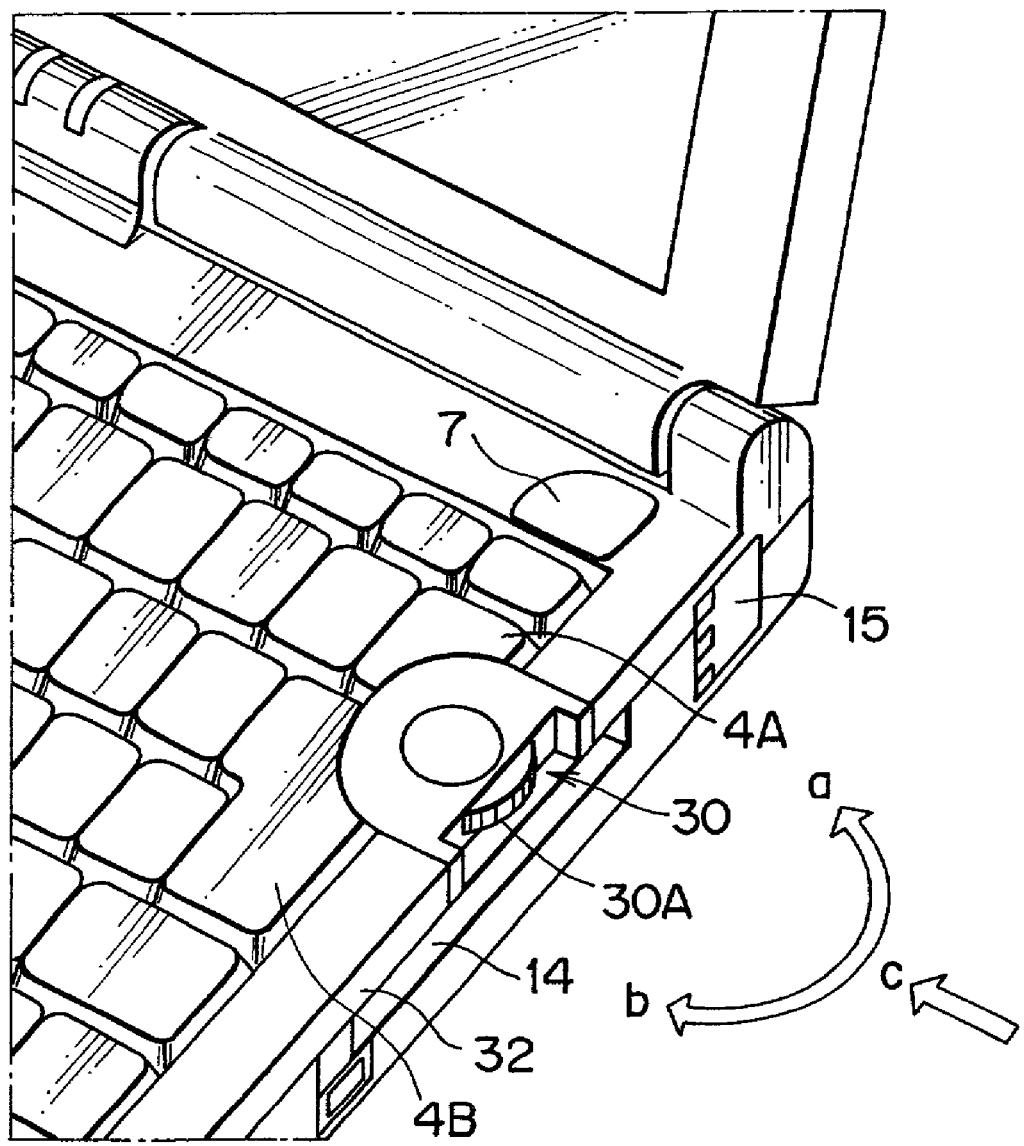
FIG. 4 is a schematic external view of a jog dial mounted on the body.

As shown in FIG. 4, the jog dial 30 comprises a notched disc-like knob 30A with longitudinal stripe slightly projecting from a casing 32 of the body 2. The knob 30A is not only rotated in arrowed directions "a" and "b" but also pushed in an arrowed direction "c" to carry out various processes.

The disc-like knob 30A, when rotated, has a slight "caught" feel at each predetermined angle of rotation (called a rotary click hereunder). These clicks tell the user through tactile sensation how much the knob 30A is rotated.

(1-2) Circuit Structure of the Notebook Computer

Figure 5:
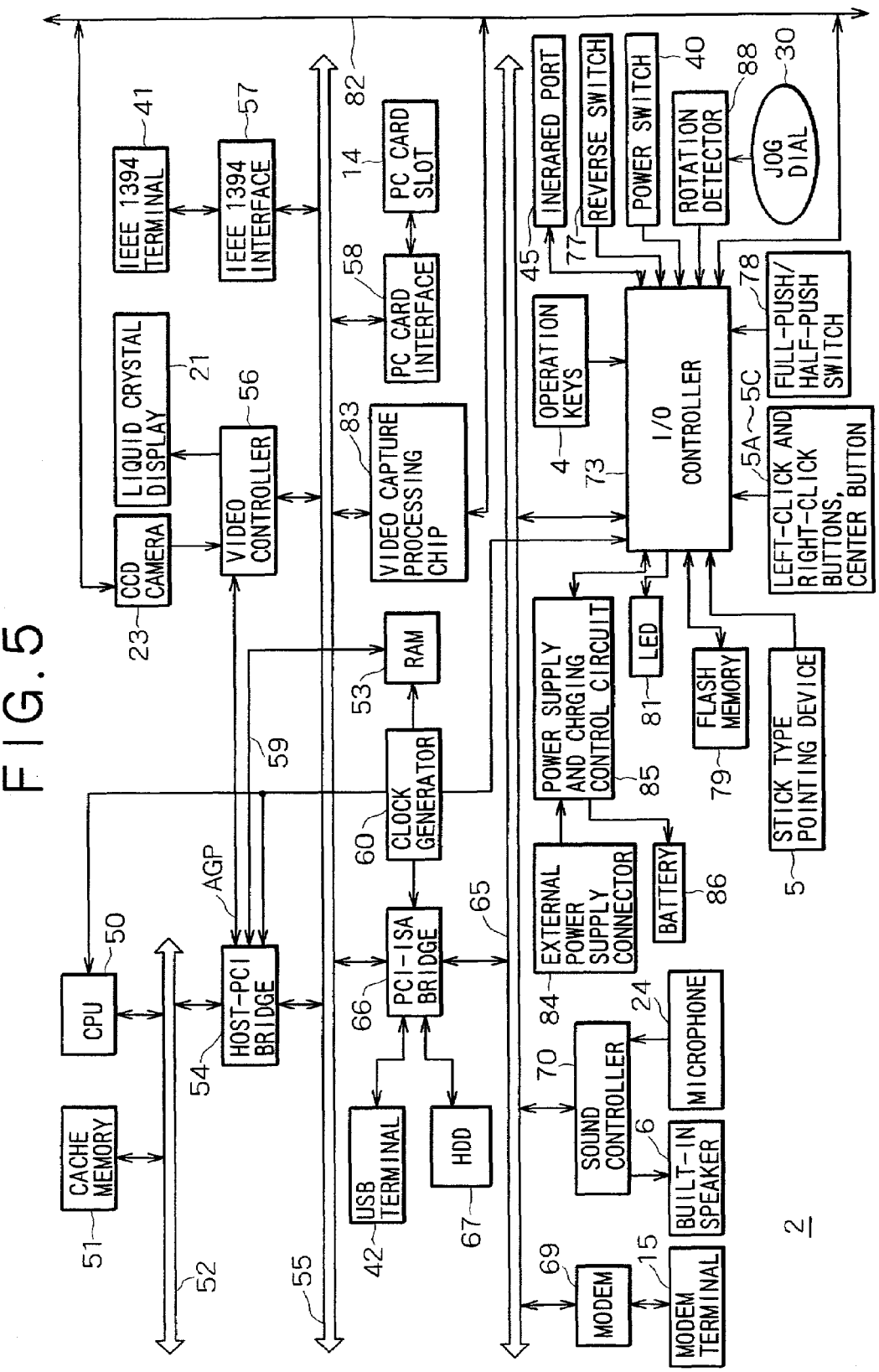
FIG. 5 is a block diagram indicating a circuit structure of the notebook-type personal computer.

As shown in FIG. 5, the body 2 of the notebook computer 1 has a host bus 52 connected to a CPU (Central Processing Unit) 50 that provides overall control of various feature of the body 2. The CPU 50 loads programs into a RAM (Random Access Memory) 53 and executes the programs at predetermined rates in keeping with a system clock signal from a clock generator 60, whereby diverse functions are implemented.

The host bus 52 is also connected to a cache memory 51 that caches data for use by the CPU 50. The memory affords the CPU 50 high-speed access to the data it needs.

The host bus 52 is connected to a PCI (Peripheral Component Interconnect) bus 55 via a host-PCI bridge 54. The PCI bus 55 is connected to a video controller 56, an IEEE (Institute of Electrical and Electronic Engineers) 1394 interface 57, a video capture processing chip 83, and a PC card interface 58.

The host-PCI bridge 54 controls data exchanges between the CPU 50 on the one hand and the video controller 56, video capture processing chip 83, IEEE 1394 interface 57, and PC card interface 58 on the other hand. The bridge 54 also permits control of the RAM 53 connected through a memory bus 59.

The host-PCI bridge 54 is connected to the video controller 56 by means of an AGP (Accelerated Graphics Port) signal line. The connection permits high-speed transfer of image data between the host-PCI bridge 54 and the video controller 56.

The video capture processing chip 83 is connected to an $I^2C$ bus 82 (generally called the SM (System Management) bus) acting as a serial bus. When the chip 83 is supplied with image data captured by the CCD camera 23 through the $I^2C$ bus 82, the image data are placed temporarily into an internal frame memory (not shown). The video capture processing chip 83 then subjects the image data to a JPEG (Joint Photographic Experts Group) image compression process to create JPEG image data before storing the JPEG image data again into the frame memory.

In response to a request from the CPU 50, the video capture processing chip 83 transfers the JPEG image data from the frame memory directly to the RAM 53 using a bus master function. The data are then transferred either as a JPEG image (still picture) or a motion JPEG image (motion picture) to a hard disc drive (HDD) 67.

The video controller 56 subjects to a suitable graphics process the image data captured by the CCD camera 23 or the JPEG image data coming from the video capture processing chip 83. The video controller 56 then places the processed data into an internal VRAM (Video Random Access Memory) and retrieves the data as needed for output to the LCD 21 for on-screen display.

Furthermore, the video controller 56 may display a plurality of window screens by outputting to the LCD 21 image data based on various application programs supplied as needed.

Where an optional function is to be added, the PC card interface 58 is provided by means of a relevant PC card. Inserting the PC card allows the interface 58 illustratively to secure connection with such external devices as a CD-ROM (Compact Disc-Read Only Memory) drive or a DVD (Digital Versatile Disk) drive.

The IEEE 1394 interface 57 is connected directly to the IEEE 1394 terminal 41. Through the IEEE 1394 terminal 41, the interface 57 connects to such external devices as another computer or a digital video camera.

The PCI bus 55 is connected to an ISA (Industrial Standard Architecture) bus 65 via a PCI-ISA bridge 66. The PCI-ISA bridge 66 is connected to the HDD 67 and USB terminal 42.

The PCI-ISA bridge 66 comprises an IDE (Integrated Drive Electronics) interface, a configuration register, an RTC (Real-Rime Clock) circuit, and a USB interface. In keeping with the system clock signal from the clock generator 60, the PCI-ISA bridge 66 controls the HDD 67 via the IDE interface.

The hard disc of the HDD 67 stores an OS (operating system) such as Windows 98 (trademark), an image capture program, a jog dial utility program, a jog dial driver, an electronic map program, an image management program, an image editing program, a mail program, and other application programs. These programs are transferred to the RAM 53 as needed.

The PCI-ISA bridge 66 controls via the USB interface such external devices as a floppy disc drive, a printer, and a USB mouse, not shown, connected through the USB terminal 42. The bridge 66 also controls a modem 69 and a sound controller 70 that may be connected to the ISA bus 65.

Via the modem terminal 15, the modem 69 connects to and communicate with an Internet service provider (called a provider hereunder) over a public switched telephone network and the Internet, not shown. The sound controller 70 controls both the acquisition of audio signals from the microphone 24 and the supply of audio signals to the internal speaker 6.

The ISA bus 65 is connected to an I/O (in/out) controller 73. When power is supplied to the I/O controller 73 from an external power supply connector 84 through a power supply and charging control circuit 85, activation of the power switch 40 causes the I/O controller 73 to supply power to the circuits involved. In this case, too, the I/O controller 73 operates in accordance with the system clock signal from the clock generator 60.

The power supply and charging control circuit 85, under control of the I/O controller 73, controls charging of a battery pack 86 connected to the battery connector 17 (FIG. 3).

The I/O controller 73 comprises a microcontroller, an I/O interface, a CPU, a ROM and a RAM. Based on a BIOS (Basic Input/Output System) held in a flash memory 79, the I/O controller 73 controls data exchanges between the OS and application programs on the one hand and such peripherals as the LCD 21 and HDD 67 on the other hand.

The I/O controller 73 is connected to the infrared port 45. The connection allows the I/O controller 73 to communicate illustratively with other computers using infrared rays. The I/O controller 73 is also connected to a reverse switch 77. The reverse switch 77 is activated when the image pickup unit 22 of the CCD camera 23 is rotated by 180 degrees in the backward direction of the LCD 21. The 180-degree rotation is reported to the CPU 50 via the PCI-ISA bridge 66 and host-PCI bridge 54.

The I/O controller 73 is also connected to a full-push/half-push switch 78. Bringing the shutter button 7 on the top of the body 2 into a half-pushed state activates the full-push/half-push switch 78, and the half-pushed state is reported to the CPU 50. Putting the shutter button 7 into a fully-pushed state also turns on the full-push/half-push switch 78, and the fully-pushed state is reported to the CPU 50.

More specifically, with image capture software booted from the hard disc of the HDD 67 into the RAM 53, the shutter button 7 brought into its half-pushed state by the user causes the CPU 50 to enter a still picture mode and to operate the CCD camera 23 to freeze the image. Putting the shutter button 7 into its fully-pushed state causes the CPU 50 to capture the still picture data from the freeze process for transmitting to the video controller 56.

If the capture software is not started, the shutter button 7 brought into its fully-pushed state by the user causes the CPU 50 to enter an motion picture mode. In this mode, the CPU 50 may acquire motion pictures for up to 60 seconds and transmit the acquired pictures to the video controller 56.

The ROM of the I/O controller 73 contains a wake-up program, a key input monitoring program, an LED control program, a jog dial status monitoring program, and other control programs.

The jog dial status monitoring program is associated with the jog dial utility program held on the hard disc of the HDD 67. The monitoring program checks whether the jog dial 30 is rotated or pushed.

The wake-up program is designed to make the CPU 50 execute a predetermined process when the current time fed from the RTC circuit in the PCI-ISA bridge 66 reaches a predetermined start time. The key input monitoring program checks whether any input is made by any of the operation keys 4 and other key switches.

The LED control program controls illumination of LEDs (Light-Emitting Diodes) comprising a power lamp PL, a battery lamp BL, and a message lamp ML.

The RAM of the I/O controller 73 contains a set time register for the wake-up program, a key input monitoring register for the key input monitoring program, an LED control register for the LED control program, an I/O register for the jog dial status monitoring program, and registers for other programs.

The set time register accommodates time information about a start time set by the user for use with the wake-up program. Based on the wake-up program, the I/O controller 73 checks whether the current time fed from the RTC circuit has reached the user-preset start time. If the preset start time is judged to be reached, the CPU 50 is notified thereof. In turn, the CPU 50 starts an application program associated with the start time and carries out necessary processes in accordance with the application program.

The key input monitoring register stores operation key flags reflecting entries from the operation keys 4, stick 5, left-click button 5A, right-click button 5B, and center button 5C.

That is, based on the operation key flags in the key input monitoring program, the I/O controller 73 checks illustratively whether the stick 5 is used for a pointing operation or whether the left-click button 5A, right-click button 5B or center button 5C is clicked. Any such pointing operation or click operation is reported to the CPU 50.

The pointing operation refers to a proceeding whereby the stick 5 is pushed by fingertips crosswise and lengthwise to move the mouse cursor to a desired position on the screen. The click operation involves quickly pushing and releasing the left-click button 5A or right-click button 5B by fingertips.

The CPU 50 executes processes designated by mouse cursor movements through the pointing operation and by click operations.

The LED control register accommodates illumination flags reflecting the illuminating status of various LEDs including the power lamp PL, battery lamp BL and message lamp ML.

Illustratively, suppose that a push on the jog dial 30 caused the CPU 50 to read the electronic mail program from the hard disc of the HDD 67 and load it into the RAM 53 for execution and that the electronic mail program has detected the receipt of an e-mail. In that case, the I/O controller 73 sets a relevant illumination flag in the LED control register and activates an LED 81 to illuminate the message lamp ML based on that flag.

The I/O register for the jog dial status monitoring program sets a rotation flag and a push flag reflecting the jog dial 30 being rotated and pushed.

The I/O controller 73 is connected to the jog dial 30 through a rotation detector 88. When the user rotates and pushes the jog dial 30 to select a desired item from a plurality of menu items, the I/O controller 73 sets the corresponding rotation flag and push flag in the I/O register and notifies the CPU 50 thereof.

(1-3) Image Transfer Process by the Notebook Computer

Figure 6:
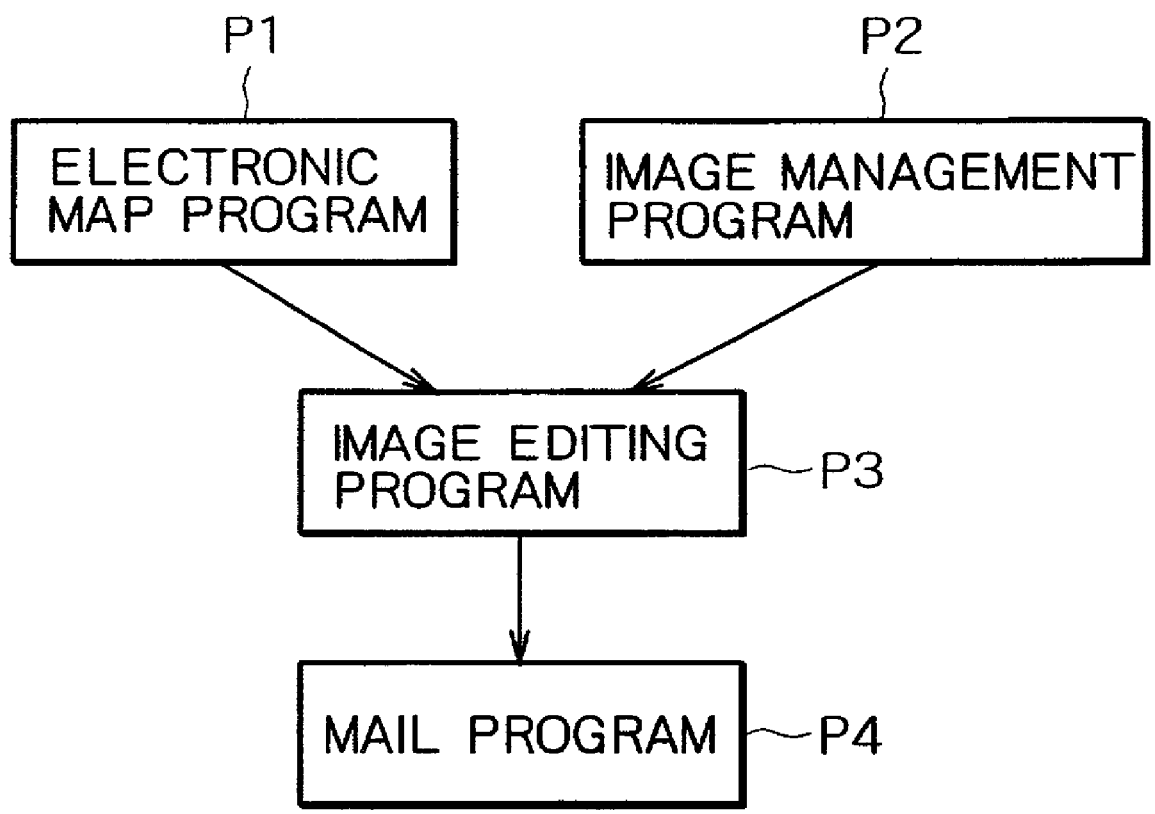
FIG. 6 is a block diagram showing how programs used by the notebook-type personal computer are related to one another.

The notebook computer 1, as depicted in FIG. 6, transfers two kinds of images to an image editing program P3: images displayed by software compatible with the image editing program P3 such as an electronic map program P1 for retrieving electronic map data from the HDD 67 for on-screen display and an image management program P2 for managing images picked up by the CCD camera 23; and images displayed by software not compatible with the image editing program P3. The transfer of such images to the image editing program P3 is accomplished by a simple operation. A transferred image is displayed by the image transfer program P3 with no change in the position and scale of the original image displayed on the LCD 21 (FIG. 1). The program P3 is then used to edit the transferred image in various manners such as adding characters or lines to the image.

The notebook computer 1 is arranged further to transfer the image edited by the image editing program P3 to the electronic mail program P4 through a simple operation. The electronic mail program P4 may attach the image to an e-mail it has prepared.

Described below is a typical process for transferring an image displayed by the electronic map program P1 to the image editing program P3.

Figure 7:
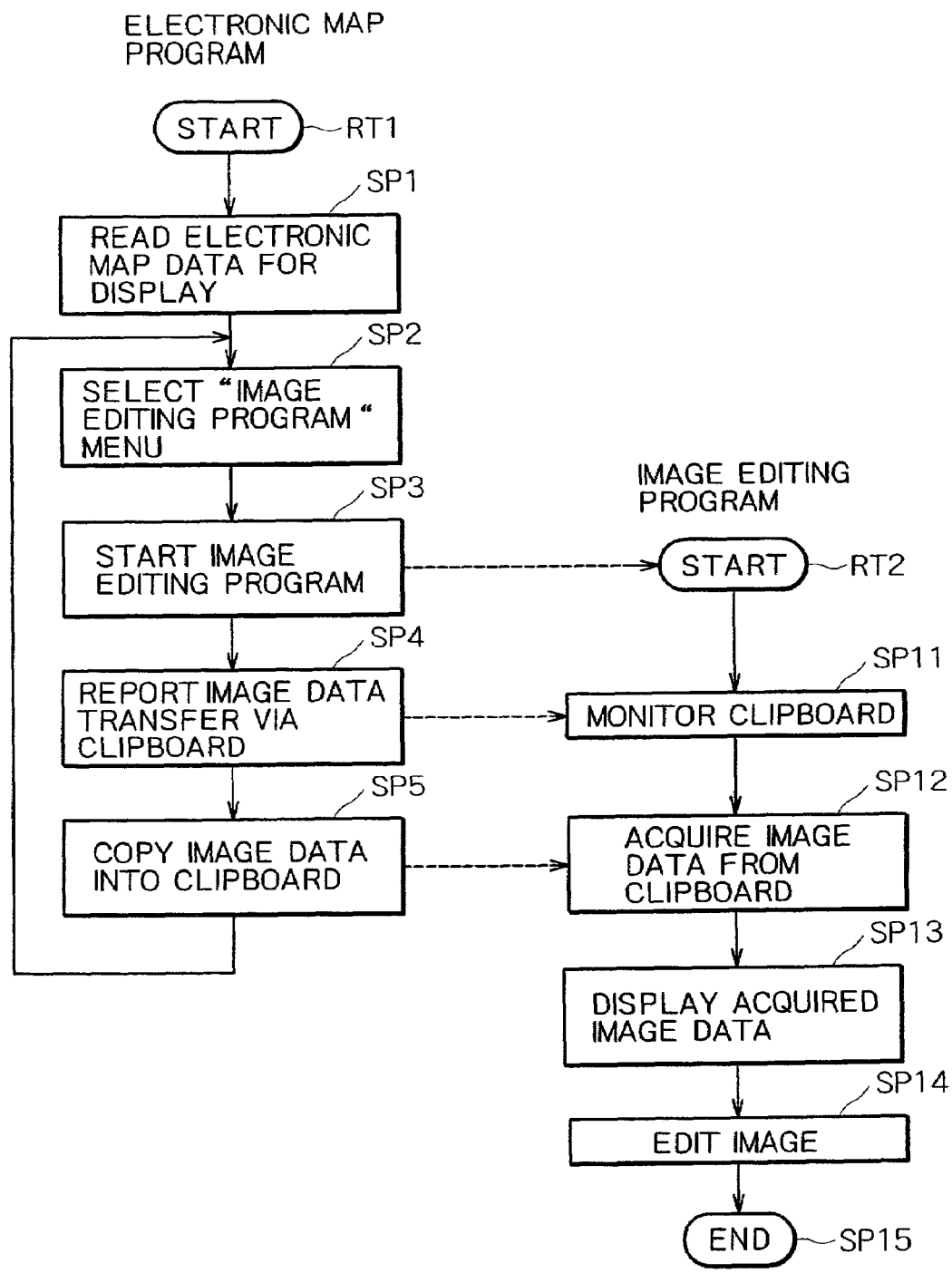
FIG. 7 is a flowchart of steps constituting a typical image transfer routine.

The CPU 50 of the notebook computer 1 reads the electronic map program P1 from the HDD 67 and loads it into the RAM 53 for execution in response to the user's appropriate operation. That is, the CPU 50 enters a routine RT1 of the electronic map program P1 through its start step before reaching step SP1, as shown in FIG. 7.

Figure 8:
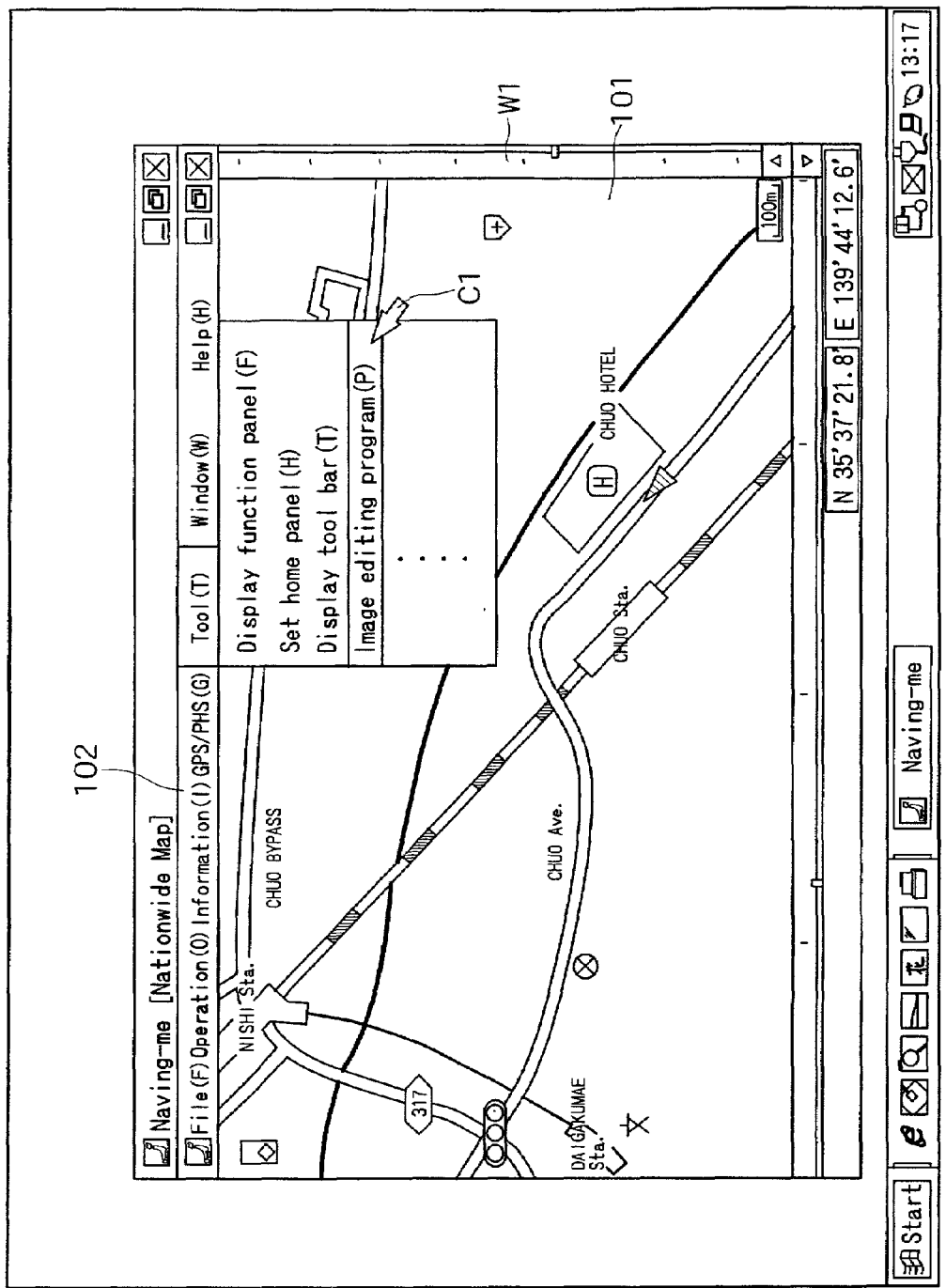
FIG. 8 is a schematic view depicting a typical structure of a display window of an electronic map program.

In step SP1, the CPU 50 brings a display window W1 for the electronic map program P1 onto the LCD 21, reads electronic map data from the HDD 67, and displays a map image 101 based on the map data in the display window W1, as shown in FIG. 8. Step SP1 is followed by step SP2.

The window W1 has a menu bar 102 shown at its top into which various operations may be input. The menu bar 102 comprises: a file (F) menu for manipulating files such as reading and writing; an operation (O) menu for performing image-related operations such as enlarging and contracting the map image 101; an information (I) menu for performing information-related operations such as manipulating landmark icon indications in the map image 101; a GPS/PHS (G) menu for displaying information about the current position using a GPS (Global Positioning System) or PHS (Personal Handyphone System); a tool (T) menu for displaying various tool bars and for starting other programs; a window (W) menu for giving window displays; and a help (H) menu for displaying detailed explanations of program usages.

In step SP2, the CPU 50 waits for an image editing program (P) menu to be selected from the tool (T) menu with a pointer C1 manipulated by operation of the stick 5 (FIG. 1). When the image editing program (P) menu is selected, the CPU 50 goes to step SP3 and starts the image editing program P3 by loading it into the RAM 53 upon its retrieval from the HDD 67.

In that manner, the CPU 50 enters a routine RT2 of the image editing program P3 through its start step before reaching step SP11.

At the same time, the CPU 50 reaches step SP4 of the electronic map program P1. In step SP4, the CPU 50 notifies the image editing program P3 that image data of the map image 101 currently on display will be transferred to the program P3 by way of a clipboard. Step SP4 is followed by step SP5.

In step SP5, the CPU 50 acting as image copying means copies the image data of the currently displayed map image 101 to the clipboard. Step SP5 is followed by step SP2.

With the routine RT2 of the image editing program P3 running, the CPU 50 starts monitoring the clipboard in step SP11 in response to the notice from the electronic map program P1. Step SP11 is followed by step SP12.

In step SP12, the CPU 50 acting as image transferring means acquires the image data from the clipboard after verifying that the data have been copied into the clipboard by the electronic map program P1. Step SP12 is followed by step SP13.

Figure 9:
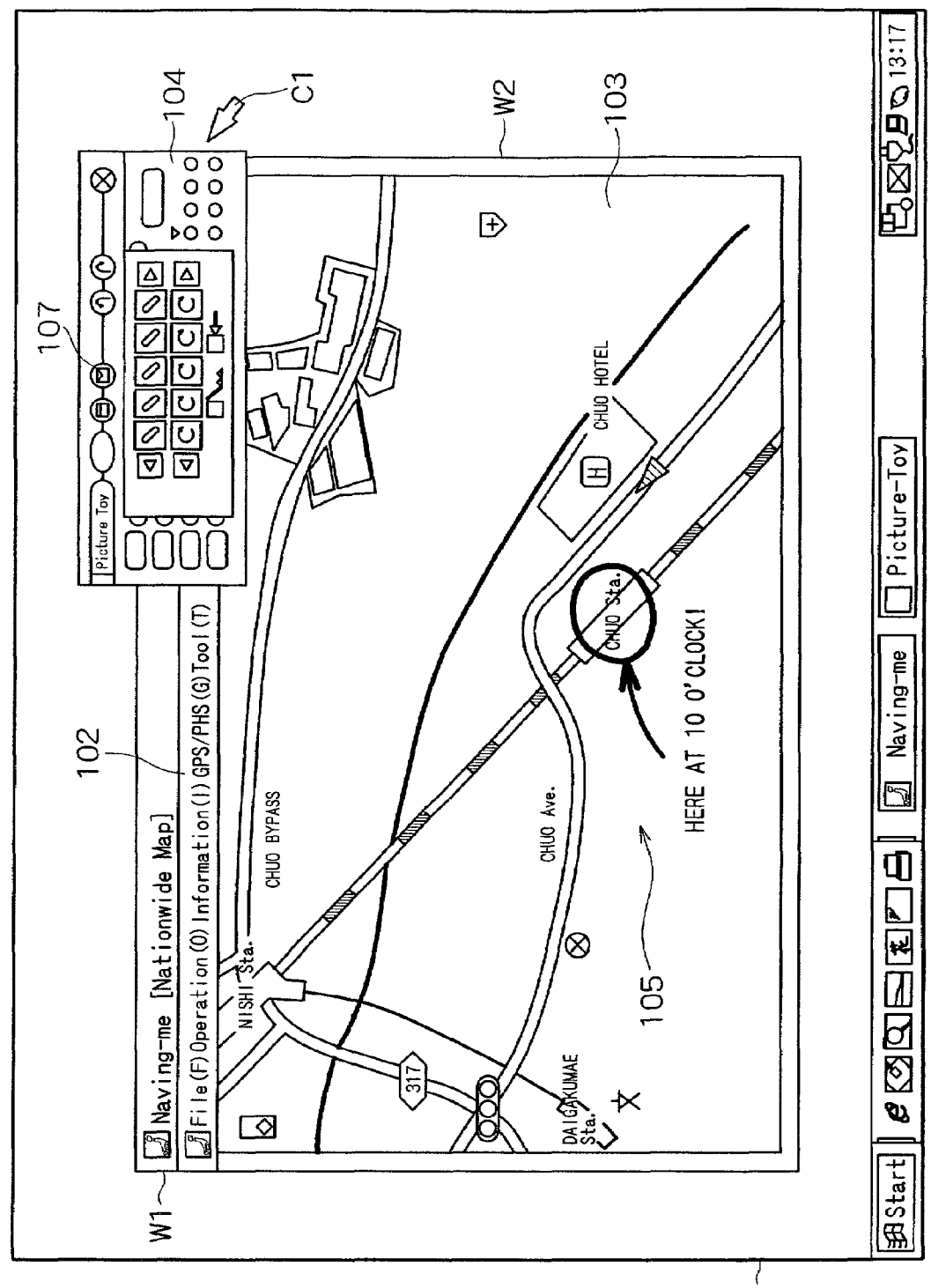
FIG. 9 is a schematic view illustrating a typical structure of a display window of an image editing program.

In step SP13, as shown in FIG. 9, the CPU 50 displays the image data obtained from the clipboard as an editable image 103 in a display window W2 of the image editing program P3. Concurrently, the CPU 50 displays an editing palette 104 from which to choose various tools for editing the displayed image.

At this point, the CPU 50 displays the editable image 103 in the same position and on the same scale as the map image 101 (FIG. 8) shown in the display window W1 of the electronic map program P1.

In step SP14, the CPU 50 additionally displays on the editable image 103 a drawn item 105 corresponding to the image editing operations (e.g., writing lines and characters onto the map) performed by the user operating the stick 5 and operation keys 4.

It should be noted here that the image editing program P3 displays the editable image 103 in the same position and on the same scale as the map image 101 of the electronic map program P1, in a manner permitting the displayed image to be edited as desired. That means the user can edit the image feeling as if he or she is editing the map image 101 itself.

When the image editing operations have ended in step SP14, the CPU 50 reaches step SP15. This terminates the image transferring process.

Described below is a typical process for transferring an image displayed by the image management program P2 to the image editing program P3.

Figure 10:
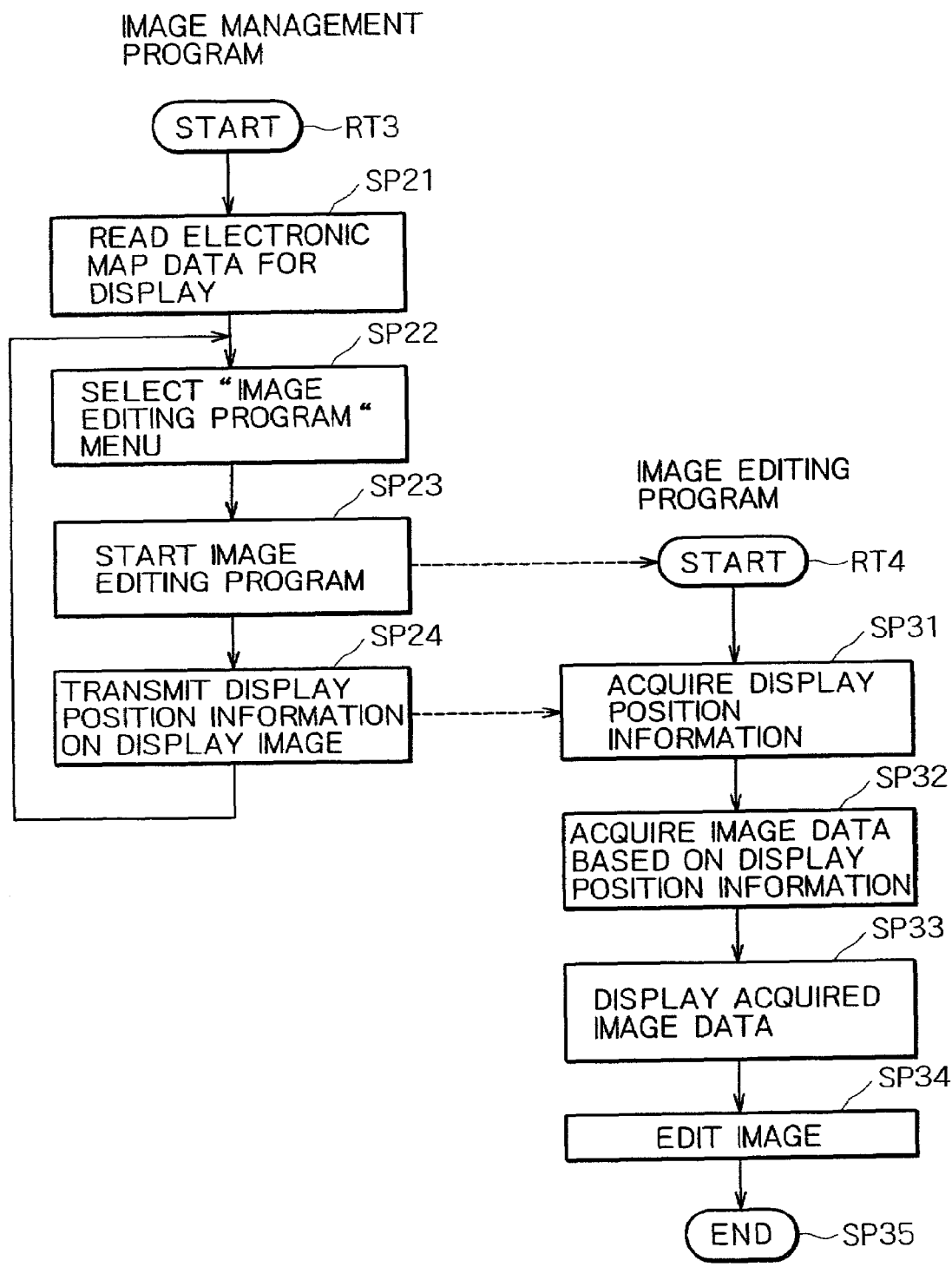
FIG. 10 is a flowchart of steps constituting another image transfer routine.

The CPU 50 of the notebook computer 1 reads the image management program P2 from the HDD 67 and loads it into the RAM 53 for execution in response to the user's appropriate operation. That is, the CPU 50 enters a routine RT3 of the image management program P2 through its start step before reaching step SP21, as shown in FIG. 10.

Figure 11:
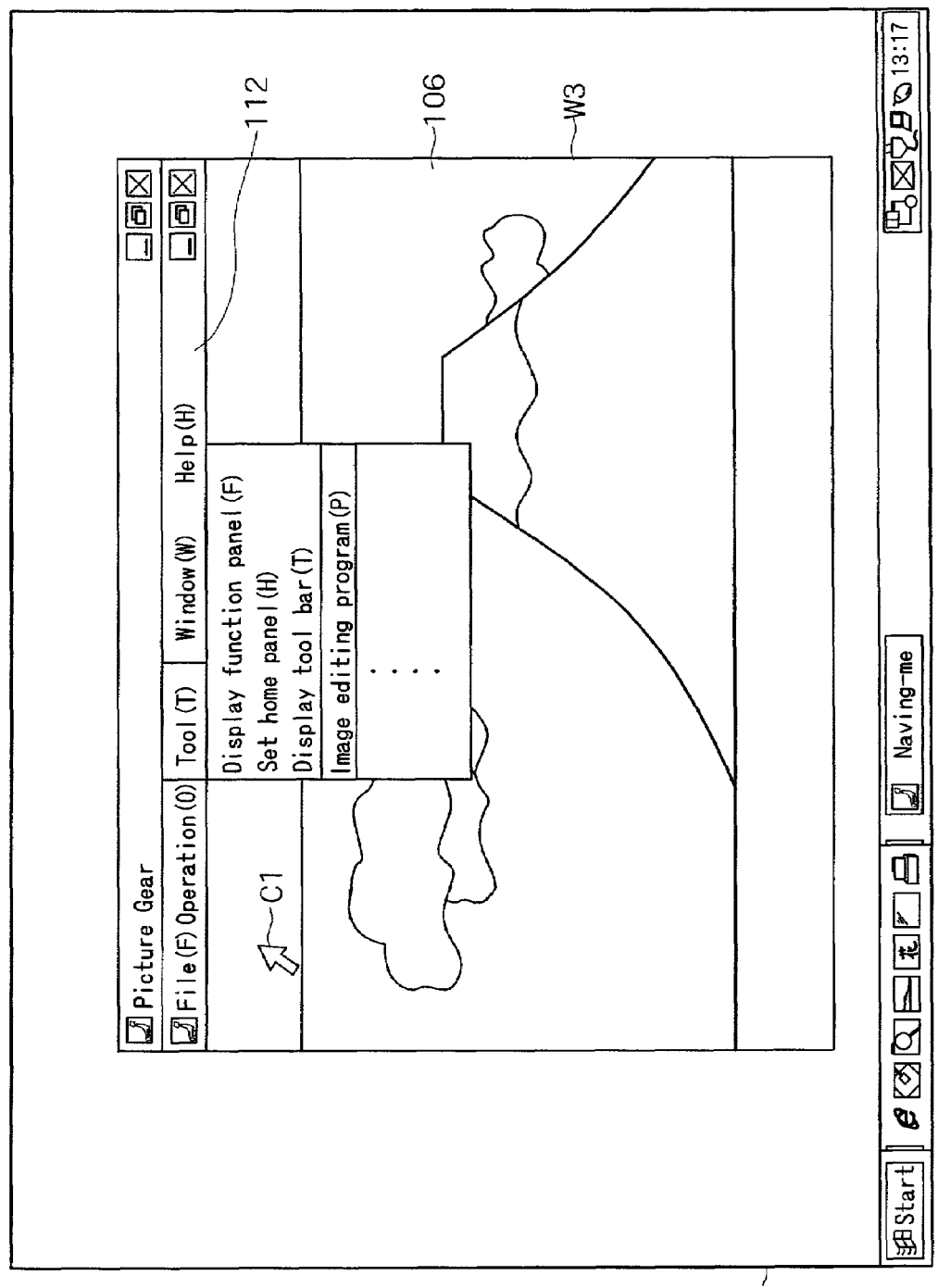
FIG. 11 is a schematic view indicating a typical structure of a display window of an image management program.

In step SP21, the CPU 50 brings a display window W3 of the image management program P2 onto the LCD 21, reads from the HDD 67 the image data selected in an image selection screen (not shown) of the image management program P2, and brings a display image 106 based on the image data into the display window W3, as shown in FIG. 11. Step SP21 is followed by step SP22.

The window W3 has a menu bar 112 shown at its top into which various operations may be input. The menu bar 112 comprises: a file (F) menu for manipulating files such as reading and writing; an operation (O) menu for performing image-related operations such as enlarging and contracting the display image 106; a tool (T) menu for displaying various tool bars and for starting other programs; a window (W) menu for giving window displays; and a help (H) menu for displaying detailed explanations of program usages.

If the display image 106 is shown enlarged, the display window W3 may show only part of the image data depending on the scale in use. Where the pointer C1 is dragged, a range of display of the image data is moved accordingly. In this way, a desired area of the image data may be displayed on a desired scale.

In step SP22, the CPU 50 waits for the image editing program (P) menu to be selected from the tool (T) menu with the pointer C1 manipulated by operation of the stick 5. When the image editing program (P) menu is selected, the CPU 50 goes to step SP23 and starts the image editing program P3 by loading it into the RAM 53 upon its retrieval from the HDD 67.

In that way, the CPU 50 enters a routine RT4 of the image editing program P3 through its start step before reaching step SP31.

At the same time, the CPU 50 serving as display position information acquiring means reaches step SP24 of the image management program P2 and transmits display position information about the image 106 displayed on the LCD 21 to the image editing program P3. Step SP24 is followed by step SP22.

In step SP31 of the image editing program P3, the CPU 50 acquires the display position information about the display image 106 from the image management program P2. Step SP31 is followed by step SP32.

In step SP32, the CPU 50 serving as image transferring means acquires, based on the obtained display position information, relevant image data from the storage area of the image management program P2 in the RAM 53. Step SP32 is followed by step SP33.

In step SP33, as in step SP13 of FIG. 7, the CPU 50 displays the acquired image data as the editable image 103 in the display window W2 of the image editing program P3. Concurrently, the CPU 50 displays the editing palette 104 from which to choose various tools for editing the displayed image (FIG. 9).

At this point, the CPU 50 displays the editable image 103 in the same position and on the same scale as the display image 106 in the display window W3 of the image management program P2.

In step SP34, the CPU 50 additionally displays on the editable image 103 a drawn item 105 corresponding to the image editing operations performed by the user.

It should be noted here that the image editing program P3 displays the editable image 103 in the same position and on the same scale as the display image 106 of the image management program P3, in a manner permitting the displayed image to be edited as desired. It should also be noted that the image data applicable to the display range moved in keeping with the drag operation of the pointer C1 are retrieved successively from the storage area of the image management program P2 in the RAM 53 for display as the editable image 103. The setup allows the user to edit the image by altering the scale and display range as desired; it gives the impression that the user manipulates the image as if he or she is editing the display image 106 itself offered by the image management program P3.

When the image editing operations have ended in step SP34, the CPU 50 reaches step SP35. This terminates the process.

As described, the notebook computer 1 transfers image data from software compatible with the image editing program P3 such as the electronic map program P1 or image management program P2 to the image editing program P3 for on-screen display with no change in the image display position. The transfer is executed by a simple operation in one of two ways: either by resorting to the clipboard, or by use of display position information.

What follows is a description of a typical process for transferring to the image editing program P3 a display image of a program not compatible with the program P3.

In this case, the image editing program P3 is started while an image originating program is already in active use. The image editing program P3 is then used to designate a display window of the image originating program. The designation of the window causes the image editing program P3 to acquire the displayed image from the designated display window.

The CPU 50 of the notebook computer 1 reads the image editing program P3 from the HDD 67 and loads it into the RAM 53 for execution in response to the user's appropriate operation.

Figure 12:
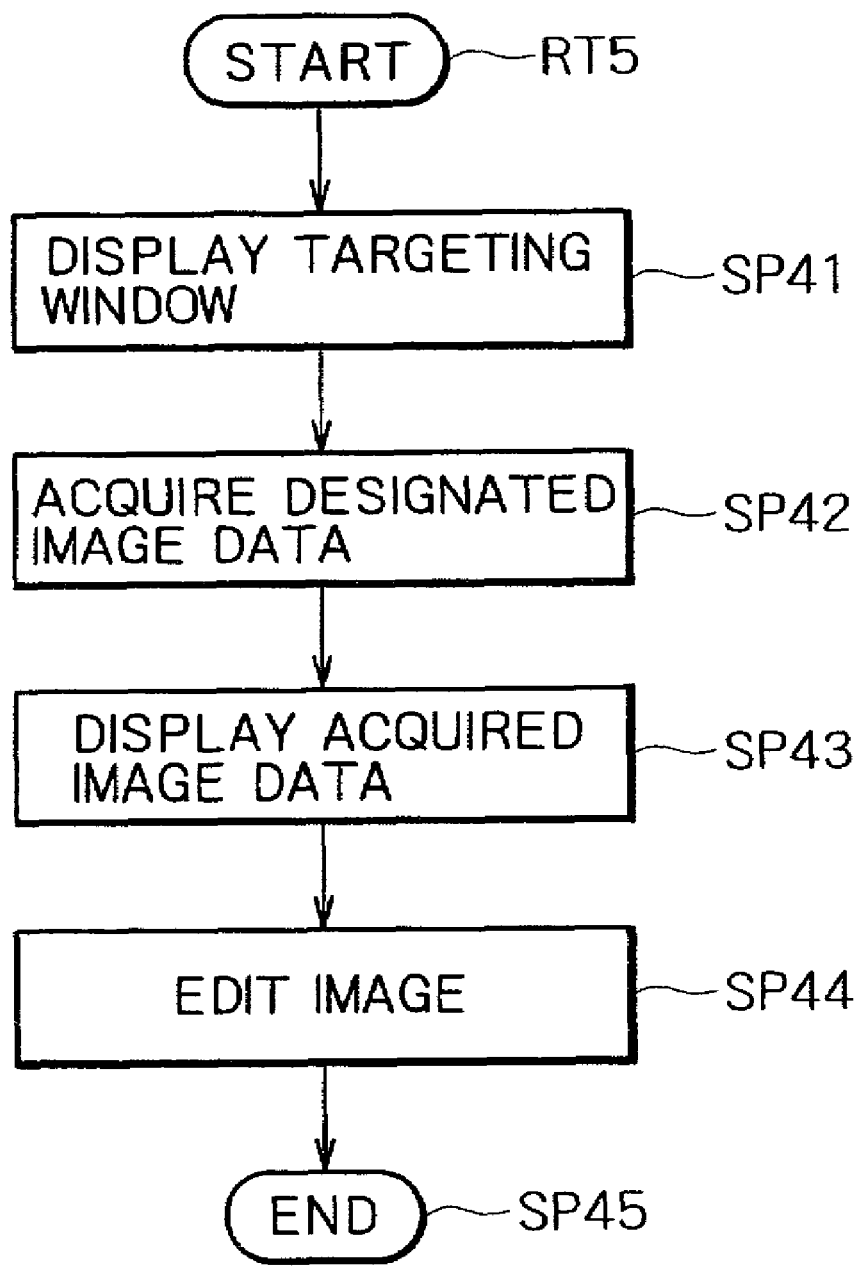
FIG. 12 is a flowchart of steps constituting another image transfer routine.

That is, the CPU 50 enters a routine RT5 of the image editing program P3 through its start step before reaching step SP41, as shown in FIG. 12.

Figure 13:
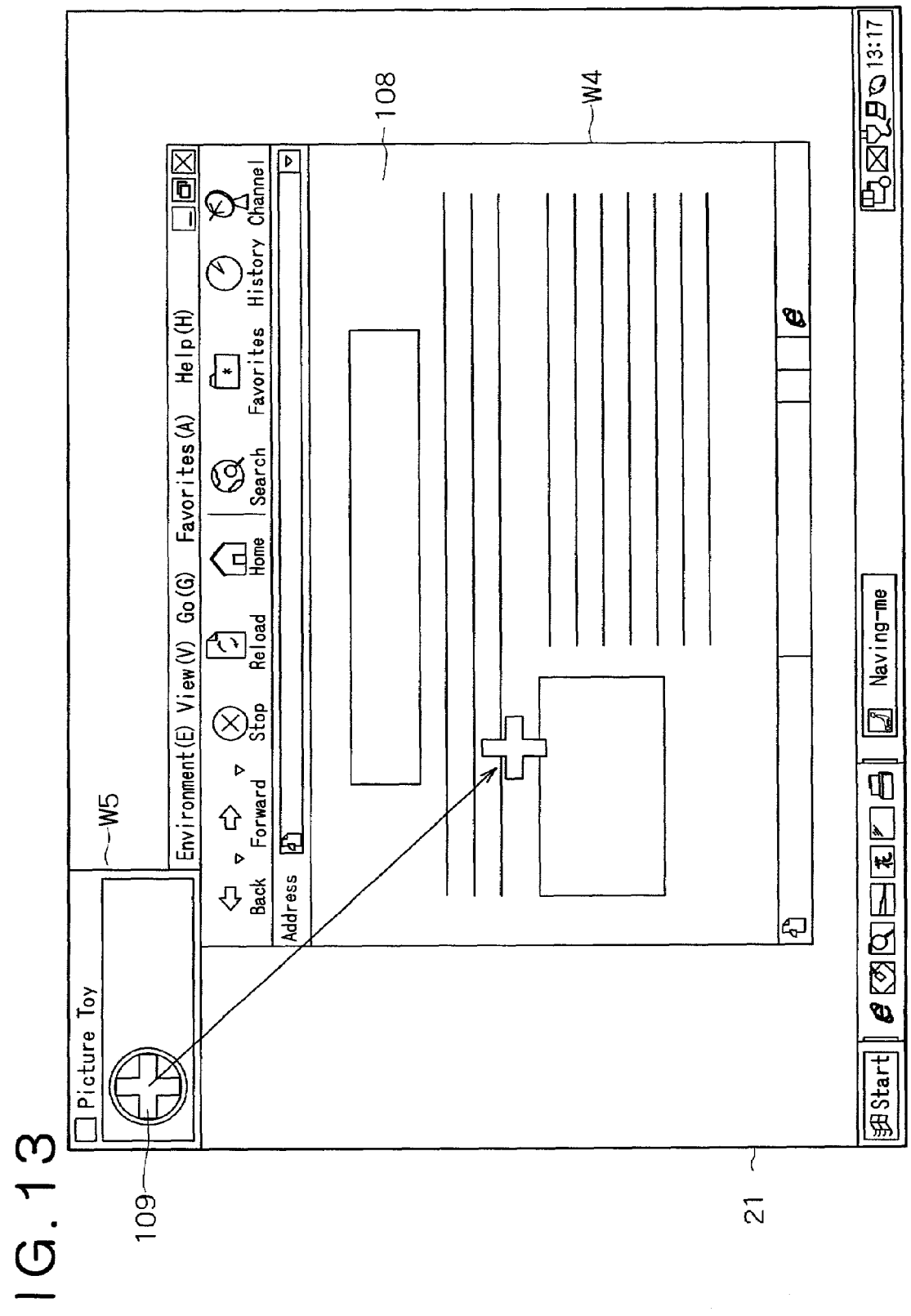
FIG. 13 is a schematic view sketching a typical structure of a targeting window.

In step SP41, as shown in FIG. 13, the CPU 50 displays a targeting window W5 of the image editing program P3 on the LCD 21. At this point, the image originating program is already in active use (a Web browser program in the example of FIG. 13) and its display window W4 is also displayed on the LCD 21.

The targeting window W5 has a cross-shaped targeting pointer 109. Operating the stick 5 permits manipulation of the targeting pointer 109 over the screen. With the targeting pointer 109 positioned onto the display window of a desired program, double-clicking the left-click button 5A (FIG. 1) designates the image displayed in the display window as the image to be transferred.

In step SP42, the CPU 50 moves the targeting pointer 109 on display in keeping with the user's operation of the stick 5. When the left-click button 5A is double-clicked, the CPU 50 acquires via the clipboard the image data of a display image 108 in the display window W4 in which the targeting pointer 109 is positioned. Step SP42 is followed by step SP43.

In step SP43, as in step SP13 of FIG. 7, the CPU 50 displays the acquired image data as the editable image 103 in the display window W2 of the image editing program P3. Concurrently, the CPU 50 displays the editing palette 104 from which to choose various tools for editing the displayed image (FIG. 9).

At this point, the CPU 50 displays the editable image 103 in the same position and on the same scale as the display image 108 (FIG. 13) shown in the display window W4 of the Web browser program.

In step SP44, the CPU 50 additionally displays on the editable image 103 a drawn item 105 corresponding to the image editing operations performed by the user manipulating the stick 5 and operation keys 4. When the image editing operations have ended in step SP44, the CPU 50 reaches step SP45. This terminates the process.

As described, the notebook computer 1 transfers image data from software not compatible with the image editing program P3 to the image editing program P3 for on-screen display with no change in the image display position. The transfer is executed by a simple operation.

Figure 14:
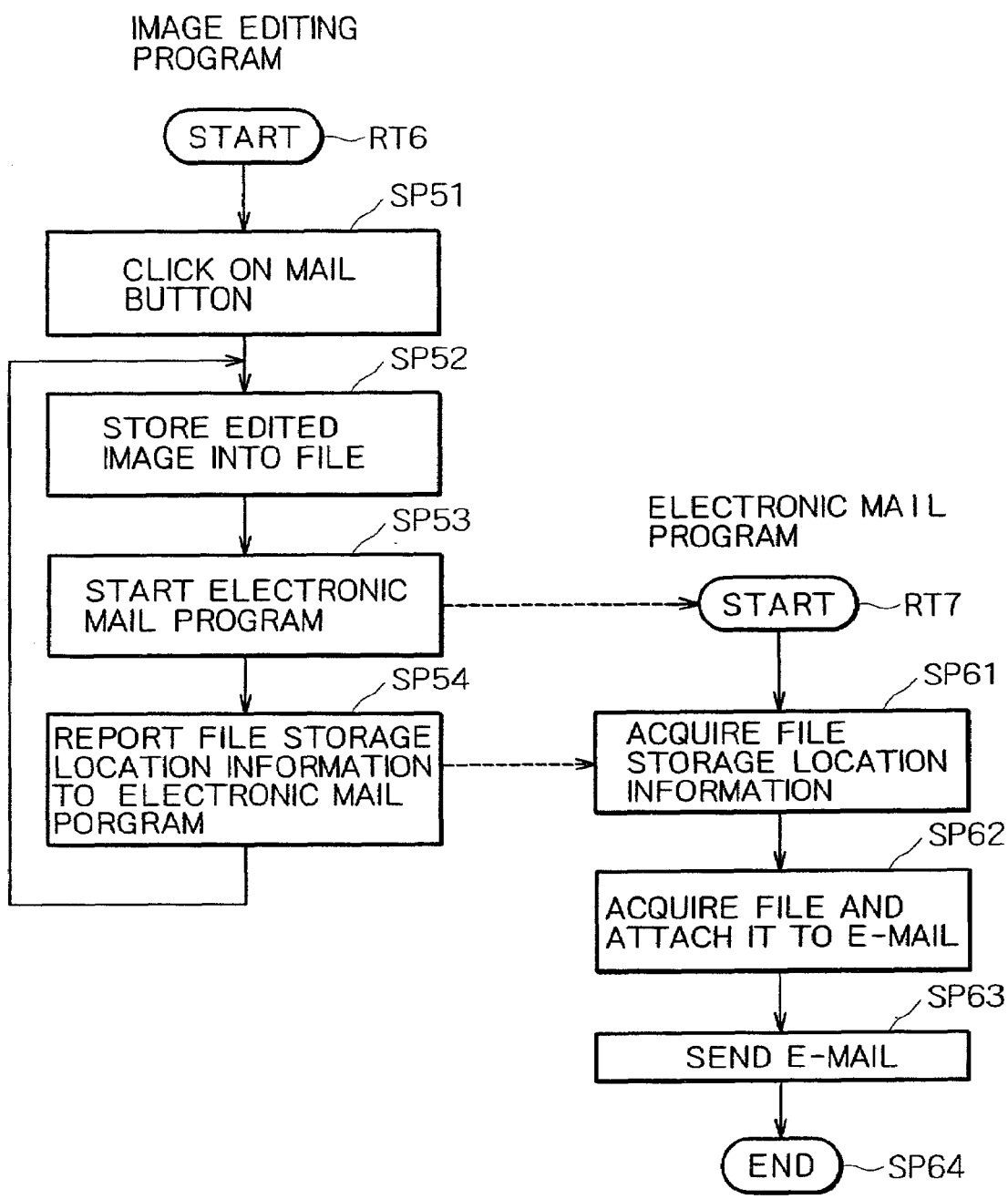
FIG. 14 is a flowchart of steps constituting another image transfer routine.

Described below with reference to the flowchart of FIG. 14 is a typical process for transferring to the electronic mail program P4 an image edited by the image editing program 3 so that the image may be attached to an e-mail for simultaneous transmission by the program P4.

The CPU 50 of the notebook computer 1 enters a routine RT6 of the image editing program P3 through its start step before reaching step SP51. When the mail button 107 on the editing palette 104 is clicked on with the pointer C1 (FIG. 9), step SP52 is reached.

In step SP52, the CPU 50 serving as image storing means turns the editable image 103 currently displayed in the display window W2 into an image file and stores the file into a suitable directory on the HDD 67. Step SP52 is followed by step SP53.

In step SP53, the CPU 50 reads the electronic mail program P4 from the HDD 67 and loads into the RAM 53 for execution.

That is, the CPU 50 enters a routine RT7 of the electronic mail program P4 through its start step before reaching step SP61.

At the same time, the CPU 50 reaches step SP54 of the image editing program P3 and sends to the electronic mail program P4 information about where the image file is located (i.e., storage directory name). Step SP54 is followed by step SP51.

Meanwhile, the CPU 50 acquires the image file storage location information from the image editing program P3 in step SP61 of the electronic mail program P4, before reaching step SP62.

Figure 15:
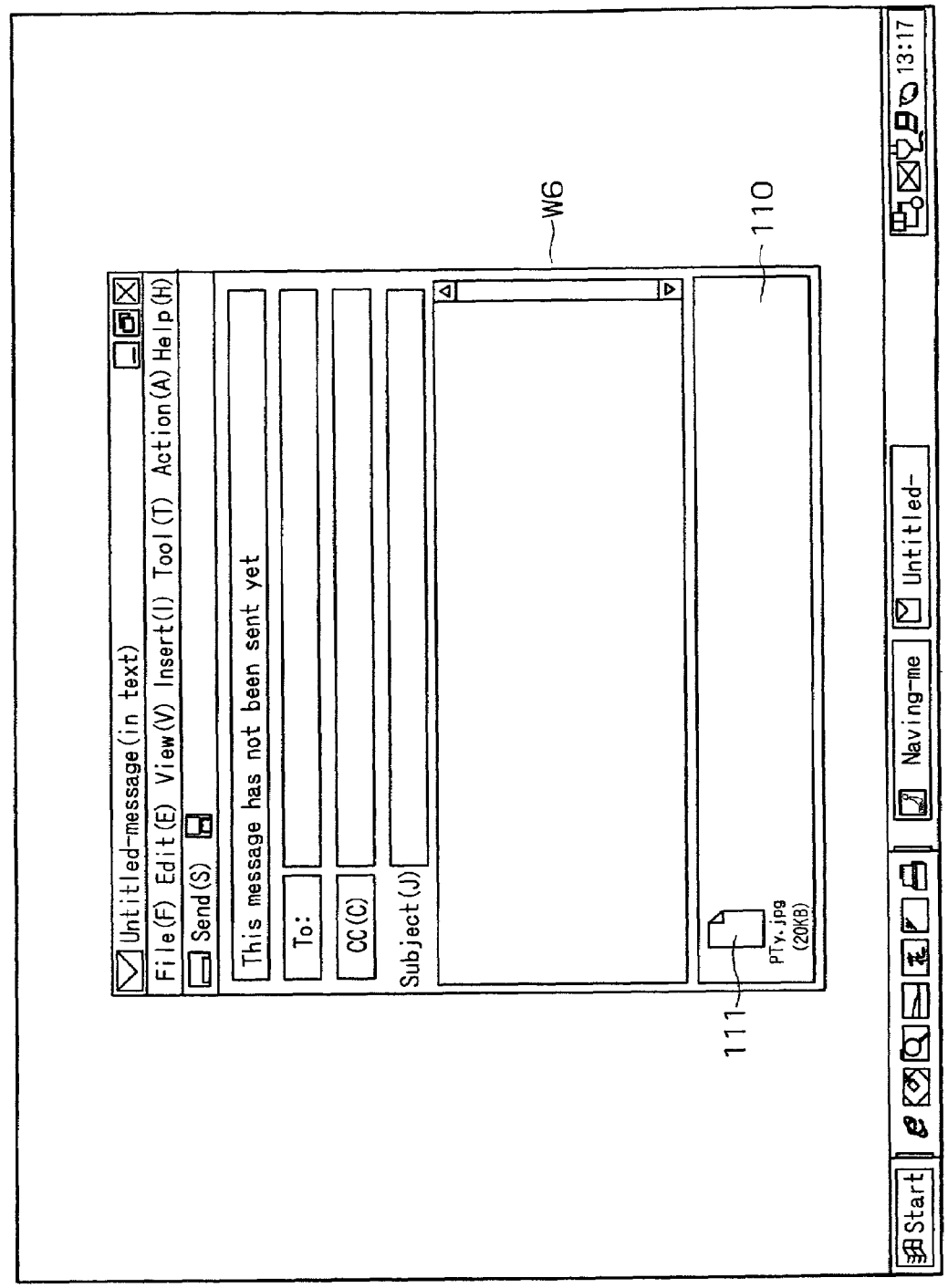
FIG. 15 is a schematic view presenting a typical structure of a display window of an electronic mail program.

In step SP62, the CPU 50 serving as image transferring means enters a new mail preparation state by bringing a display window W6 of the electronic mail program P4 onto the LCD 21, as shown in FIG. 15. Concurrently, the CPU 50 obtains the image file from the HDD 67 based on the acquired storage location information, attaches the file to a newly prepared e-mail, and displays an attachment file icon 111 indicative of the acquired image file within an attached file display frame 110 of the display window W6. Step SP62 is followed by step SP63.

When preparation of the new e-mail has ended in step SP63, the CPU 50 transmits the e-mail together with its attachment before reaching step SP64. This terminates the process.

As described, the notebook computer 1 turns the image on display into a file, stores the file in an appropriate location, and reports information about where the file in question is stored. This permits subsequent transfer of the image data to the destination program.

(1-4) Operation and Effects

In the above setup, the notebook computer 1 transfers the displayed image of an image originating program such as the electronic map program P1 or image management program P2 to the image editing program P3 in keeping with the user's operations such as manipulation of relevant menus and designation of the targeting pointer 109.

The notebook computer 1 then displays the transferred image as an editable image, i.e., an image to be edited with lines and characters added thereto, with no change in the position and scale of the image before the transfer.

In the manner described, the notebook computer 1 transfers the displayed image to the image editing program P3 in a reliable and simplified operation. The scheme allows the user to edit the image feeling as if he or she is manipulating the image displayed by the image originating program itself.

Furthermore, the notebook computer 1 transfers the edited image to the mail program P4 so that the image is attached to an e-mail prepared by the program P4 in a reliable and simplified operation.

In the inventive setup above, the image displayed by the image originating program is transferred to the image editing program P3 for display as an editable image with no change in the position and scale of the original image. The user can thus get images transferred easily and reliably from one program to another. While editing the image, the user feels as if he or she is dealing with the original image offered by the image originating program. As a result, the ease of use is enhanced significantly in terms of image transfer and editing.

(1-5) Variations of the First Embodiment

The invention was described above as embodied by the notebook-type notebook computer 1 for image transfer processing. However, this is not limitative of the invention. Alternatively, various devices including a PDA (Personal Digital Assistant) and a portable telephone may be adopted to practice the invention advantageously.

In the first embodiment above, the stick type pointing device 5 of the notebook computer 1 was mainly used to edit the displayed image. Alternatively, other types of pointing devices such as a mouse, a track ball and/or a tablet may be connected to the notebook computer 1 for use in editing the image.

In the above embodiment, the CPU 50 was shown executing the image transfer process based on the electronic map program P1, image management program P2, image editing program P3, and electronic mail program P4 retrieved from the HDD 67. Alternatively, a suitable program storage medium containing relevant programs including the electronic map program P1, image management program P2, image editing program P3 and electronic mail program P4 may be installed so that the CPU 50 may retrieve the programs therefrom and perform the same image transfer process.

The programs constituting the series of steps described above may be installed upon use into the notebook computer 1 for execution thereby, carried by suitable program storage media such as package media including floppy disks, CD-ROMs and DVDS; or semiconductor memories, magnetic disks and the like where the programs are stored temporarily or permanently. Such program storage media may accommodate the programs that have been delivered through wired or wireless communication media such as local area networks, the Internet, and digital satellite broadcasting networks, as well as through diverse communication interfaces such as routers and modems.

(2) Second Embodiment (2-1) Overall Configuration of a Network System

Figure 16:
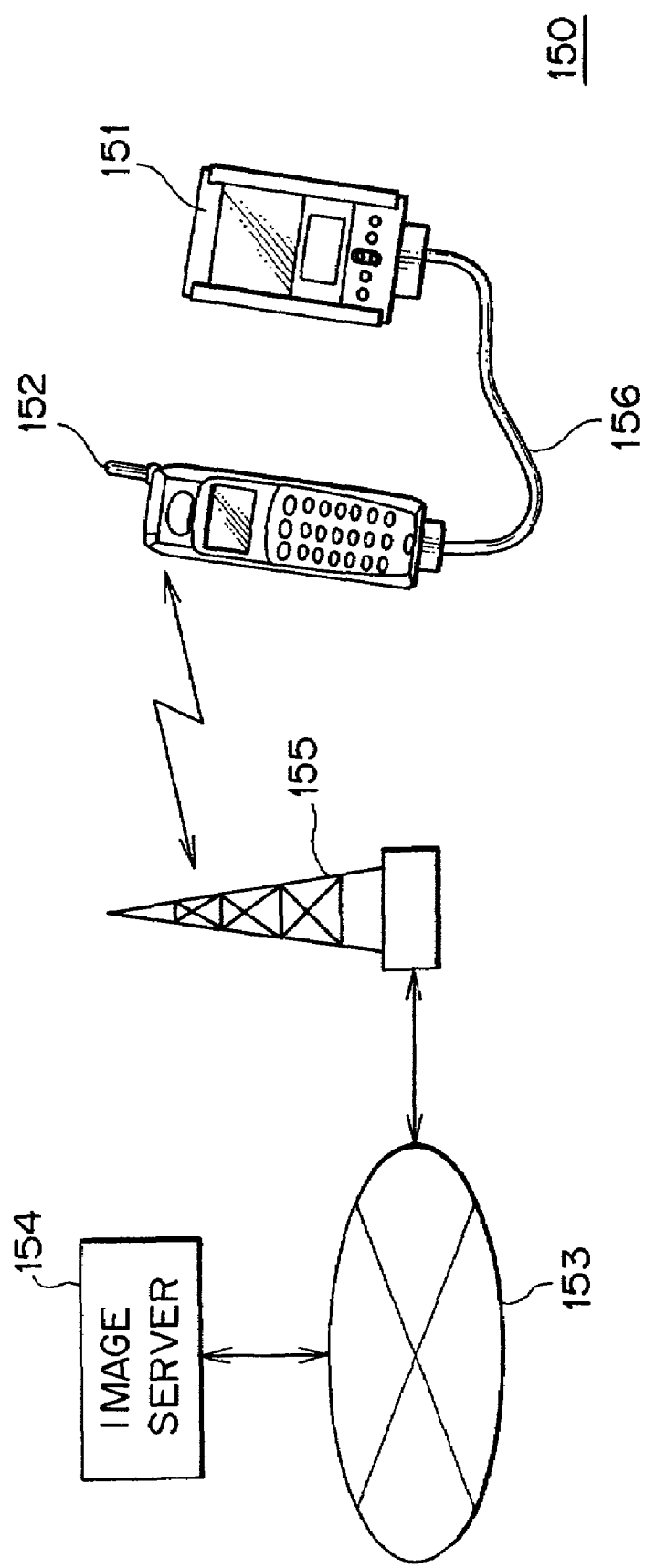
FIG. 16 is a block diagram showing a typical structure of a network system practiced as a second embodiment of this invention.

FIG. 16 schematically shows a typical configuration of a network system 150 practiced as a second embodiment of this invention. The network system 150 is made up of a PDA 151, a digital portable telephone 152, and an image server 154 connected to the Internet 153.

The digital portable telephone 152 is connected wirelessly to a base station 155 that is linked to other portable telephones and wired telephones as well as to servers and various information processing terminals such as personal computers via the Internet 153. Through the base station 155, the digital portable telephone 152 exchanges voice and data communications with such other portable telephones, wired telephones, servers and personal computers.

The digital portable telephone 152 is also connected to the PDA 151 via a connection cable 156. Through the digital portable telephone 152, the PDA 151 exchanges data with the image server 154 or with various information processing terminals connected to the Internet 153.

The image server 154 stores a plurality of sets of image data compressed by use of an image compression coding method such as that of JPEG (Joint Photographic Experts Group). In response to download requests from any of the information processing terminals connected to the Internet 153, the image server 154 transmits the requested image data to the requesting terminal.

The PDA 151 downloads image data from the image server 154 for on-screen display in keeping with the user's appropriate operations. As with the first embodiment of the invention in the form of the notebook-type notebook computer 1, the PDA 151 allows the user to edit the displayed image as desired and to transmit the edited image as an attachment to an e-mail.

(2-2) Structure of the PDA

Figure 17:
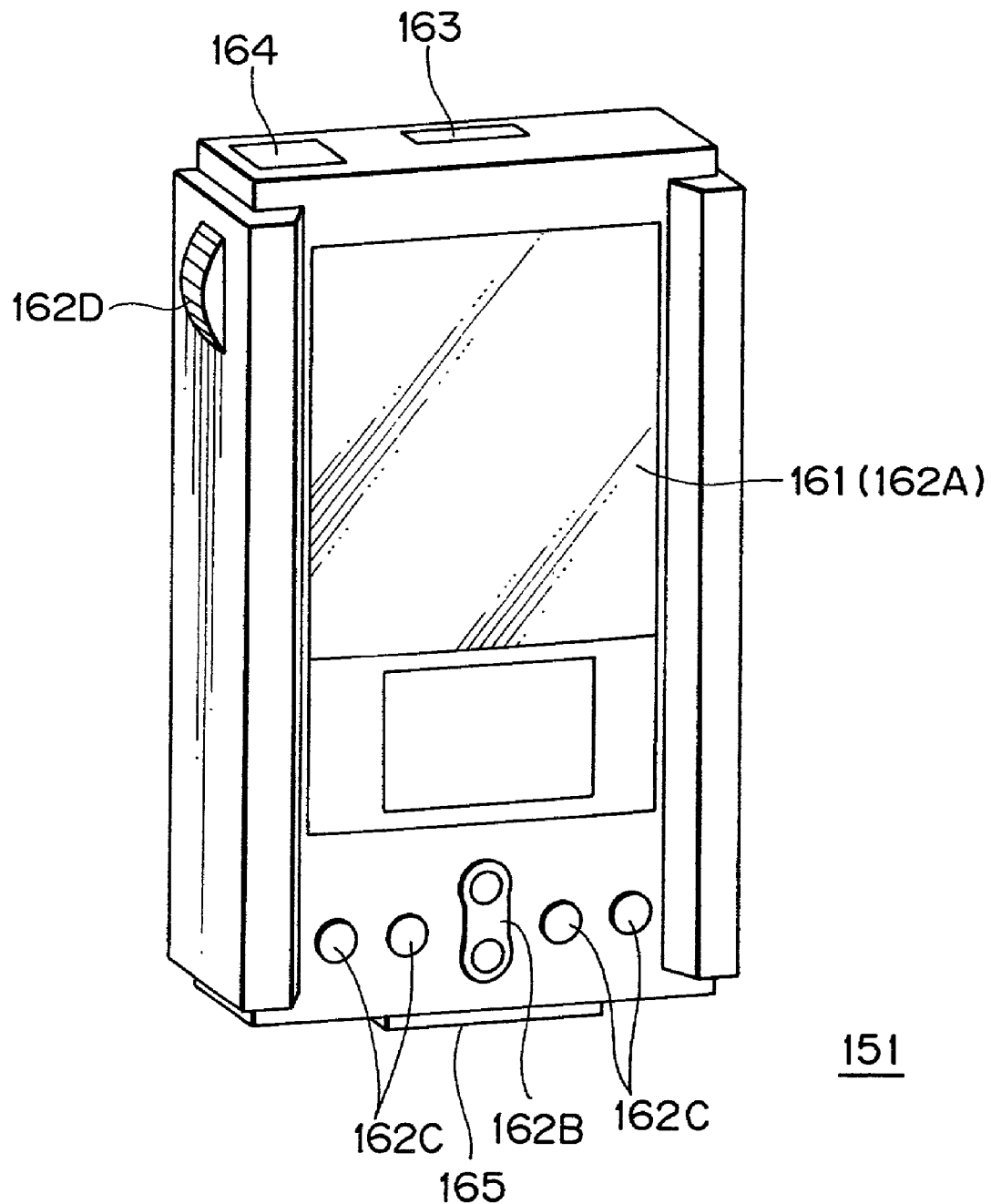
FIG. 17 is a schematic perspective view sketching a typical structure of a PDA.

As shown in FIG. 17, the PDA 151 illustratively has a display part 161 composed of a liquid crystal display (LCD) at the front. On the surface of the display part 161 is a touch panel 162A constituted by a transparent touch-sensitive film. With the help of a dedicated pen called a stylus, the user may trace desired lines and characters over the surface of the touch panel 162A feeling as if he or she is directly writing onto the image shown on the display part 161.

Under the display part 161 are scroll buttons 162B for scrolling the image displayed on the display part 161 and a plurality of program buttons 162C for starting specifically preset programs. In the top left corner of the PDA 15, a jog dial 162D is provided.

At the top center of the PDA 151 is a memory card slot 163 into which a memory card (not shown) may be inserted.

To the left of the memory card slot 163 is an infrared port 164 compatible with IrDA (Infrared Data Association) standards.

At the bottom of the PDA 151 is an I/O connector 165 that may be connected to the connection cable 156 (FIG. 16) or to a connection terminal called a cradle for connection with a personal computer.

Figure 18:
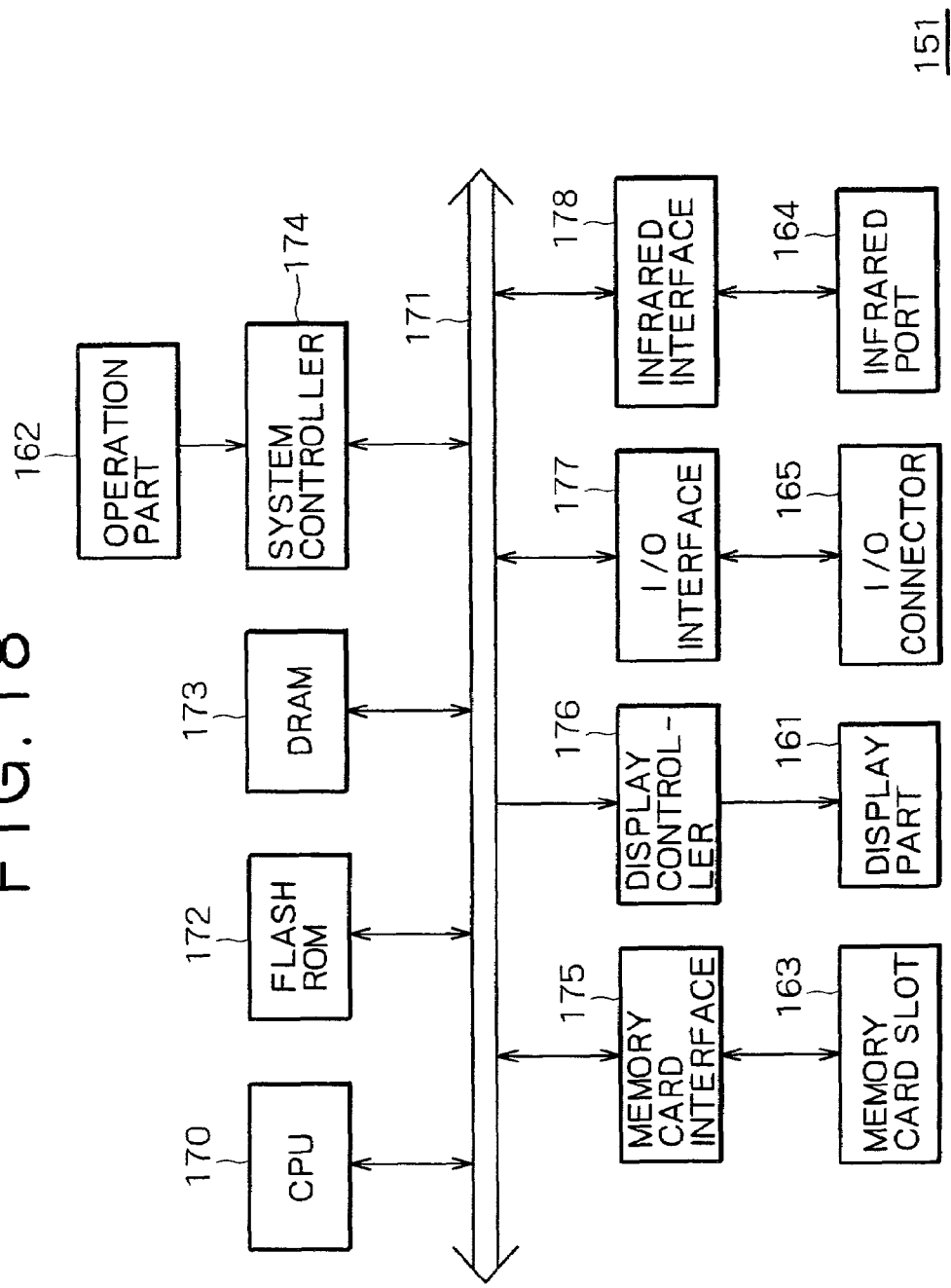
FIG. 18 is a block diagram depicting a circuit structure of the PDA.

A typical circuit structure of the PDA 151 is described below. As shown in FIG. 18, the PDA 151 has a CPU 170 for overall control of its various functions. The CPU 170 is connected via a bus 171 to a flash ROM 172, a DRAM 173, a system controller 174, a memory card interface 175, a display controller 176, an I/O interface 177, and an infrared interface 178.

The system controller 174 is connected to an operation part 162 comprising the touch panel 162A, scroll buttons 162B, program buttons 162C, and jog dial 162D (FIG. 17). In accordance with the user's operations on the operation unit 162, the CPU 170 reads from the flash ROM 172 such programs as the image display program, image editing program and electronic mail program and loads them into the DRAM 173 for execution. Image data are generated according to each program in active use and are displayed on the display part 161 by the display controller 176.

The I/O interface 177 is connected to the I/O connector 165. The CPU 170 exchanges data with the digital portable telephone 152 (FIG. 16) or a personal computer connected through the I/O connector 165. The infrared interface 178 is connected to the infrared port 164. Through the infrared port 164, the CPU 170 exchanges data using infrared rays with an IrDA-compatible information processing terminal.

(2-3) Image Transfer Process by the PDA

Described below is a typical image transfer process performed by the PDA 151.

Under control of the image display program, the CPU 170 of the PDA 151 gains access to the image server 154 as instructed by the user, acquires list information about the image data held by the image server 154, and displays the acquired list on the display part 161. When the user selects any one of the listed images, the CPU 170 sends to the image server 154 a request for downloading the user-selected image.

In response to the download request from the PDA 151, the image server 154 transmits the corresponding image data to the PDA 151.

Also under control of the image display program, the CPU 170 of the PDA 151 stores into the DRAM 173 the image data downloaded from the image server 154. The CPU 170 then reads the image data from the DRAM 173 for display as an image on the display part 161.

The liquid crystal display of the display part 161 has a relatively low resolution (e.g., 320×240 pixels) and a limited displaying capability (i.e., the number of colors for display is limited to, say, four tones of black and white). For that reason, the CPU 170 truncates the image data chromatically for on-screen display in keeping with the displaying capability of the display part 161 so that only the range of data relevant to the resolution in effect is displayed. When the touch panel 162A, scroll buttons 162B and jog dial 162D are operated by the user, the CPU 170 moves the range of the image data display accordingly.

In the state above, the user may perform an operation prompting the start of the image editing program. In that case, the CPU 170 reads the image editing program from the flash ROM 172 and loads it into the DRAM 173 for execution. The CPU 170 serving as location acquiring means notifies the image editing program of information about the current range of image data on display.

The CPU 170 serving as image transferring means displays on the display part 161 an editable image whose range is defined by the display range information acquired when the image data are read from the DRAM 173.

The image editing program displays the editable image in the same display range as that of the image display program. The user is allowed to add such items as lines and characters to the editable image for editing purposes. Concurrently, the display range of the editable image is moved in accordance with the user's operations. Operating just like the notebook computer 1 of the first embodiment, the PDA 151 thus allows the user to edit the displayed image feeling as if he or she is editing the image offered by the image display program itself.

When a suitable operation is carried out to effect mail transmission, the CPU 170 adds the drawn item to the image data in the DRAM 173 following item entry by use of the image editing program in order to overwrite the image data for storage. At the same time, the CPU 170 reads the electronic mail program from the flash ROM 172 and loads it into the DRAM 173 for execution.

Whereas the PDA 151 truncates the image data chromatically for on-screen display on the display part 161 in keeping with its displaying capability, the image data within the DRAM 173 are retained with their original number of display colors intact. It follows that when the PDA overwrites the drawn item onto the image data in the DRAM 173 for storage, the original image data may be edited as desired with their initial number of display colors kept unchanged regardless of the displaying capability of the display part 161.

Under control of the electronic mail program, the CPU 170 displays on the display part 161 a mail preparation screen in which to prepare a new e-mail. When preparation of the new e-mail is completed, the CPU 170 reads a file containing the image data from the DRAM 173 and attaches the file to the e-mail for simultaneous transmission through the digital portable telephone 152.

(2-4) Operation and Effects

In the second embodiment described above, the PDA 151 under control of the image display program downloads image data from the image server 154, stores the downloaded data into the DRAM 173, and truncates the image data chromatically for on-screen display in compliance with the displaying capability of the display part 161.

Once the image editing program is started, the PDA 151 notifies the program of information about the current display range for image data. Based on the current display range information, the PDA 151 displays the acquired data as an editable image with no change in the image display range.

When operated in a simplified manner as described, the PDA 151 allows the user to edit the displayed image feeling as if he or she is manipulating the image offered by the image display program itself.

The CPU 170 adds the drawn item to the image data in the DRAM 173 following item entry by editing operations in order to overwrite the image data for storage. The edited image data are attached to an e-mail for transmission.

The second embodiment described above permits display of an editable image for the image editing program with no change in the range of the original image offered by the image display program. This gives the user the impression that he or she is editing the image as displayed by the image display program. The embodiment adds the drawn item derived from editing operations to the image data in the DRAM 173, thereby allowing the original image data to be edited as desired with their initial number of display colors kept unchanged regardless of the displaying capability of the display part 161.

(2-5) Variations of the Second Embodiment

The second embodiment was shown downloading image data from the image server 154 to the PDA 151 for editing by the latter. However, this is not limitative of the invention. Alternatively, other types of information processing apparatuses may be used to download and edit image data.

Illustratively, a digital portable telephone may be used to download image data from the image server 154, edit the downloaded data, and transmit the edited data with their initial number of display colors kept unchanged regardless of the limited displaying capability of a small-sized display part on the portable telephone.

In the second embodiment, the CPU 170 was shown executing the image editing process based on the image display program, image editing program, and electronic mail program retrieved from the flash ROM 172. Alternatively, a suitable program storage medium containing relevant programs including the image display program, image editing program and electronic mail program may be installed so that the CPU 170 may retrieve the programs therefrom and perform the same image editing process.

The programs constituting the series of steps described above may be installed upon use into the PDA 151 for execution thereby, carried by suitable program storage media such as package media including floppy disks, CD-ROMs and DVDs; or semiconductor memories, magnetic disks and the like where the programs are stored temporarily or permanently. Such program storage media may accommodate the programs that have been delivered through wired or wireless communication media such as local area networks, the Internet, and digital satellite broadcasting networks, as well as through diverse communication interfaces such as routers and modems.

While a preferred embodiment of the present invention has been described using specific terms, such description is for illustrative purposes only, and it is to be understood that changes and variations may be made without departing from the spirit or scope of the following claims.

What is claimed is:

1. An image transferring apparatus for transferring an image of map data displayed by an electronic map program to an image of map data displayed by an image editing program, the image including a graphical display of the map data, the image transferring apparatus comprising:
    first display means for reading and displaying the image of the map data displayed in a display window of the electronic map program;
    image copying means for copying the displayed image of the map data displayed in the display window of the electronic map program into a predetermined storage area without reading the map data;
    image transferring means for acquiring the copy of the displayed image of the map data from said predetermined temporary storage area; and
    second display means for displaying the acquired copy of the displayed image of the map data in an edit window of the image editing program as an editable image,
    wherein a position and scale of the editable image is the same as a position and scale of the displayed copy of the image of the map data displayed in the display window of the electronic map program, and
    the edit window of the image editing program overlays the display window of the electronic map program and does not overlay a control portion of the map program.

2. The image transferring apparatus of claim 1, wherein said display parameters of said image of map data includes a size of said image.

3. The image transferring apparatus of claim 1, wherein said storage area includes a clipboard.

4. An image transferring apparatus for transferring an image of map data displayed by an electronic map program to an image of map data displayed by an image editing program, the image including a graphical display of the map data, the image transferring apparatus comprising:
    display window position information acquiring means for acquiring display window position information about the image of map data displayed in the display window of the electronic map program on a predetermined display screen;
    image copying means for copying the displayed image of the map data displayed in the display window of the electronic map program on the predetermined display screen without reading the map data;
    acquisition image means for acquiring the copy of the displayed image of the map data based on said display window position information;
    image transferring means for transferring the acquired copy of the displayed image of the map data to an edit window of the image editing program as an editable image,
    wherein a position and scale of the editable image is the same as a position and scale of the displayed copy of the image of the map data displayed in the display window of the electronic map program, and
    the edit window of the image editing program overlays the display window of the electronic map program and does not overlay a control portion of the map program.

5. An image transferring apparatus for transferring an image of map data displayed by an electronic map program to an image of map data displayed by an image editing program, the image including a graphical display of the map data, the image transferring apparatus comprising:
    image transforming means for transforming said image displayed in the display window of said electronic map program to a data file before storing said data file into a predetermined storage location without reading the map data; and
    image transferring means for acquiring said data file from said predetermined storage location before transferring the acquired data file to an edit window of said image editing program as an editable image,
    wherein a position and scale of said image displayed in the display window of the electronic map program is the same as a position and scale of said editable image displayed in the edit window of said image editing program, and
    the edit window of the image editing program overlays the display window of the electronic map program and does not overlay a control portion of the map program.

6. An image transferring method for transferring an image of map data displayed by an electronic map program to an image of map data displayed by an image editing program, the image including a graphical display of the map data, the image transferring method comprising:
    executing the electronic map program including a display window configured to display an image of map data and a control portion configured to provide user controls;

reading the map data and displaying the image of the map data in the display window of the electronic map program;

executing the image editing program;

copying the displayed image of the map data displayed in the display window of the electronic map program into a predetermined storage area without reading the map data;

acquiring the copy of the displayed image of the map data from said predetermined storage area; and displaying the acquired copy of the displayed image of the map data in an edit window of the image editing program as an editable image, wherein a position and scale of the editable image is the same as a position and scale of the displayed copy of the image of the map data displayed in the display window of the electronic map program, and the edit window of the image editing program overlays the display window of the electronic map program and does not overlay the control portion of the map program.

7. An image transferring method for transferring an image of map data displayed by an electronic map program to an image of map data displayed by an image editing program, the image including a graphical display of the map data, the image transferring method comprising:

acquiring display position information about a display window of said image of map data displayed in the display window of the electronic map program on a predetermined display screen;

copying the displayed image of the map data displayed in the display window of the electronic map program on the predetermined display screen without reading the map data; and acquiring the copy of the displayed image of the map data based on said display window position information;

transferring the acquired copy of the displayed image of the map data to an edit window of said image editing program as an editable image, wherein a position and scale of the editable image is the same as a position and scale of said displayed copy of the image of the map data displayed in the display window of said electronic map program, and the edit window of the image editing program overlays the display window of the electronic map program and does not overlay a control portion of the map program.

8. An image transferring method for transferring an image displayed by an electronic map program to an image of map data displayed by an image editing program, the image including a graphical display of the map data, the image transferring method comprising:

transforming said image of the map data displayed in a display window of said electronic map program to a data file before storing said data file into a predetermined storage location without reading the map data; and acquiring said data file from said predetermined storage location before transferring the acquired data file to an edit window of said image editing program as an editable image, wherein a position and scale of said image displayed in the display window of the electronic map program is the same as a position and scale of said editable image displayed in the edit window of said image editing program, and the edit window of the image editing program overlays the display window of the electronic map program and does not overlay a control portion of the map program.

9. A computer program, stored in a tangible storage medium, for transferring an image of map data displayed by an electronic map program to an image of map data displayed by an image editing program, the image including a graphical display of the map data, said computer program comprising executable instructions that cause a computer to:

execute the electronic map program including a display window configured to display an image of map data and a control portion configured to provide user controls;

read the map data and display the image of the map data in the display window the electronic map program;

execute the image editing program;

copy the displayed image of the map data displayed in the display window of the electronic map program into a predetermined temporary storage area;

acquire the copy of the displayed image of the map data from said predetermined storage area without reading the map data; and display the acquired copy of the displayed image of the map data in an edit window of the image editing program as an editable image, wherein a position and scale of the editable image is the same as a position and scale of said displayed copy of the image of the map data displayed in the display window of the electronic map program, and the edit window of the image editing program overlays the display window of the electronic map program and does not overlay the control portion of the map program.

10. A computer program, stored in a tangible storage medium, for transferring an image of map data displayed by an electronic map program to an image of map data displayed by an image editing program, the image including a graphical display of the map data, said computer program comprising executable instructions that cause a computer to:

acquire display position information about a display window of said image of map data displayed in the display window of the electronic map program on a predetermined display screen;

copy the displayed image of the map data displayed in the display window of the electronic map program on the predetermined display screen without reading the map data; and acquire the copy of the displayed image of the map data based on said display window position information;

transfer the acquired copy of the displayed image of the map data to an edit window of said image editing program as an editable image, wherein a position and scale of the editable image is the same as a position and scale of said displayed copy of the image of the map data displayed in the display window of said electronic map program, and the edit window of the image editing program overlays the display window of the electronic map program and does not overlay a control portion of the map program.

11. A computer program, stored in a tangible storage medium, for transferring an image displayed by an electronic map program to an image of map data displayed by an image editing program, the image including a graphical display of the map data, said computer program comprising executable instructions that cause a computer to:

transform said image of the map data displayed in a display window of said electronic map program to a data file before storing said data file into a predetermined storage location without reading the map data; and acquire said data file from said predetermined storage location before transferring the acquired data file to an edit window of said image editing program as an editable image, wherein a position and scale of said image displayed in the display window of the electronic map program is the same as a position and scale of said editable image displayed in the edit window of said image editing program, and the edit window of the image editing program overlays the display window of the electronic map program and does not overlay a control portion of the map program.

12. An image transferring apparatus for transferring an image of source data displayed by a first program to a second program, the image including a graphical display of the source data, the apparatus comprising:

image copying means for storing a copy of said image of source data displayed by a first window of the first program into a predetermined temporary storage area, and transmitting a first notice to the second program without copying the source data;

monitoring means for monitoring said predetermined temporary storage area in response to said first notice, said monitoring means transmitting a second notice to the second program when it is determined that the copy of said image of source data has been stored into the predetermined storage area; and image transferring means for transferring the copy of said image of source data from said predetermined storage area into a second window of the second program in response to said second notice, wherein the second window of the second program overlays the first window of the first program and does not overlay a control portion of the first program.

13. An image transferring apparatus for transferring an image of source data displayed by a first program to a second program, the image including a graphical display of the source data, the image transferring apparatus, comprising:

image copying means for storing a copy of said image of source data displayed in a first window into a predetermined temporary storage area, and for transmitting a first notice to the second program;

monitoring means for monitoring said predetermined temporary storage area in response to said first notice, said monitoring means transmitting a second notice to the second program when it is determined that the copy of said image of source data has been stored into the predetermined storage area; and image transferring means for acquiring said copy of said image of source data from said predetermined storage area in response to said second notice, and transferring the acquired copy into a second window of said second program, wherein a position and scale of said copy of said image of source data displayed in the second window is the same as a position and scale of said image of source data displayed in the first window, and;

the second window of the second program overlays the first window of the first program and does not overlay a control portion of the first program.

* * * * *